US009661257B2

(12) United States Patent
Ishikawa et al.

(10) Patent No.: US 9,661,257 B2
(45) Date of Patent: May 23, 2017

(54) PROJECTION SYSTEM, IMAGE PROCESSING DEVICE, AND PROJECTION METHOD

(71) Applicants: Masaaki Ishikawa, Kanagawa (JP); Yukinaka Uchiyama, Tokyo (JP)

(72) Inventors: Masaaki Ishikawa, Kanagawa (JP); Yukinaka Uchiyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 316 days.

(21) Appl. No.: 14/485,029

(22) Filed: Sep. 12, 2014

(65) Prior Publication Data
US 2015/0077573 A1     Mar. 19, 2015

(30) Foreign Application Priority Data

Sep. 13, 2013   (JP) .................................. 2013-190304

(51) Int. Cl.
    *G03B 21/14*     (2006.01)
    *H04N 9/31*      (2006.01)
    (Continued)

(52) U.S. Cl.
    CPC ............. *H04N 5/74* (2013.01); *G03B 21/147* (2013.01); *G06T 3/005* (2013.01); *H04N 9/3185* (2013.01); *H04N 17/004* (2013.01)

(58) Field of Classification Search
    CPC .... G03B 21/147; G03B 37/04; H04N 21/147; H04N 9/3185
    (Continued)

(56) References Cited

U.S. PATENT DOCUMENTS 6,456,339 B1   9/2002   Surati et al.
6,558,006 B2   5/2003   Ioka
               (Continued)

FOREIGN PATENT DOCUMENTS

JP        3497805       2/2004
JP     2004-072623      3/2004
               (Continued)

OTHER PUBLICATIONS

U.S. Appl. No. 14/191,846, filed Feb. 27, 2014.
               (Continued)

*Primary Examiner* — William C Dowling
(74) *Attorney, Agent, or Firm* — Oblon, McClelland, Maier & Neustadt, L.L.P.

(57) ABSTRACT

A projection system for projecting an image onto a projection body by a plurality of projection devices, includes an image preparation unit configured to prepare a plurality of imaging images for calibration, a grid point extraction unit configured to extract a set of grid points that indicates a distortion of a projection image for at least one projection device from each of the plurality of imaging images for calibration, a grid point transformation unit configured to execute a transformation between a plurality of images that are imaged in different imaging ranges on the plurality of imaging images for calibration in such a manner that each set of the grid points that are commonly extracted for a subject projection device is provided in a common coordinate system, a grid point synthesis unit configured to produce a set of the grid points that are synthesized for a subject projection device based on a plurality of sets of the grid points in the common coordinate system, and a correction coefficient calculation unit configured to calculate a correction coefficient for a subject projection device based on a set of the synthesized grid points.

15 Claims, 26 Drawing Sheets

(51) Int. Cl.
*H04N 5/74* (2006.01)
*G06T 3/00* (2006.01)
*H04N 17/00* (2006.01)

(58) Field of Classification Search
USPC .............................................. 353/69, 70, 94
See application file for complete search history.

(56) References Cited

U.S. PATENT DOCUMENTS

| | | | | |
|---|---|---|---|---|
| 7,237,911 | B2* | 7/2007 | Yamada | G03B 21/56 348/383 |
| 7,854,518 | B2* | 12/2010 | Culbertson | H04N 9/3194 345/619 |
| 7,942,530 | B2* | 5/2011 | Majumder | G03B 21/26 345/1.3 |
| 8,152,312 | B2* | 4/2012 | Kondo | H04N 9/3147 345/1.1 |
| 8,328,365 | B2* | 12/2012 | Sun | H04N 9/12 353/69 |
| 8,550,635 | B2 | 10/2013 | Kotani | |
| 2011/0211065 | A1* | 9/2011 | Furui | G03B 21/14 348/135 |
| 2013/0222776 | A1* | 8/2013 | Ishikawa | H04N 9/3185 353/121 |

FOREIGN PATENT DOCUMENTS

| | | |
|---|---|---|
| JP | 3908255 | 4/2007 |
| JP | 2011-182076 | 9/2011 |
| JP | 2012-047849 | 3/2012 |

OTHER PUBLICATIONS

Extended European Search Report issued May 18, 2015 in Patent Application No. 14184479.5.
A. Majumder, et al., "Practical Multi-Projector Display Design" A.K. Peters, Ltd., XP002738680, 2007, pp. 43-76.
C. Zoido, et al., "Optimized methods for multi-projector display correction" International Journal on Interactive Design and Manufacturing, vol. 7, No. 1, XP002738681A, Feb. 2013, pp. 13-25.
Yuqun Chen, et al., "Automatic Alignment of High-Resolution Multi-Projector Displays Using an Un-Calibrated Camera" Proceedings Visualization, XP010524594A, Oct. 8, 2008, pp. 125-130.
Fernando Teubl, et al., "FastFusion: A Scalable Multi-Projector System" 14$^{th}$ Symposium on Virtual and Augmented Reality, XP32234887A, May 28, 2012, pp. 26-35.
Michael Brown, et al., "Camera-Based Calibration Techniques for Seamless Multiprojector Displays" IEEE Transactions on Visualization and Computer Graphics, vol. 11, No. 2, XP11125906A, Mar./Apr. 2005, pp. 193-206.
Chung-Jen Chen, et al., "Fundamentals of Scalable High Resolution Seamlessly Tiled Projection System" Proc. SPIE, vol. 4294, XP002738682A, Mar. 30, 2001, pp. 67-74.
Han Chen, et al., "Scalable Alignment of Large-Format Multi-Projector Displays Using Camera Homography Trees" IEEE Visualization, XP 10633311A, Oct. 27, 2002, pp. 339-346.
Ezekiel S. Bhasker, et al., "Asynchronous Distributed Calibration for Scalable and Reconfigurable Multi-Projector Displays" IEEE Transactions on Visualization and Computer Graphics, vol. 12, No. 5, XP11150906A, Sep. 2006, pp. 1101-1108.

\* cited by examiner

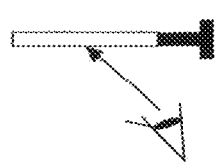
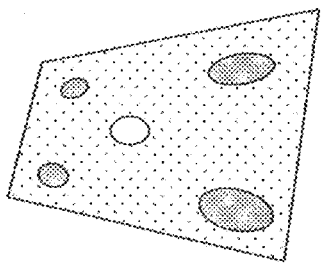
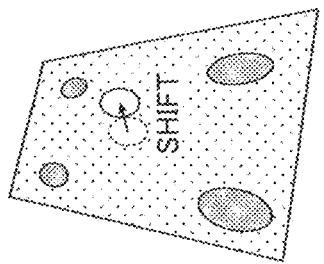
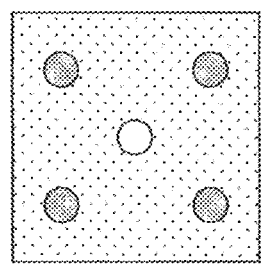
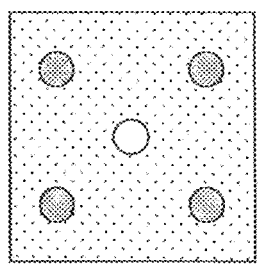
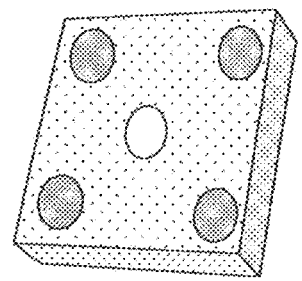
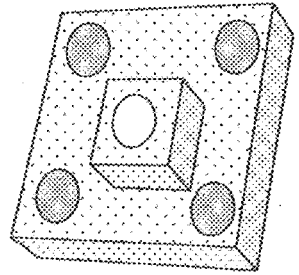

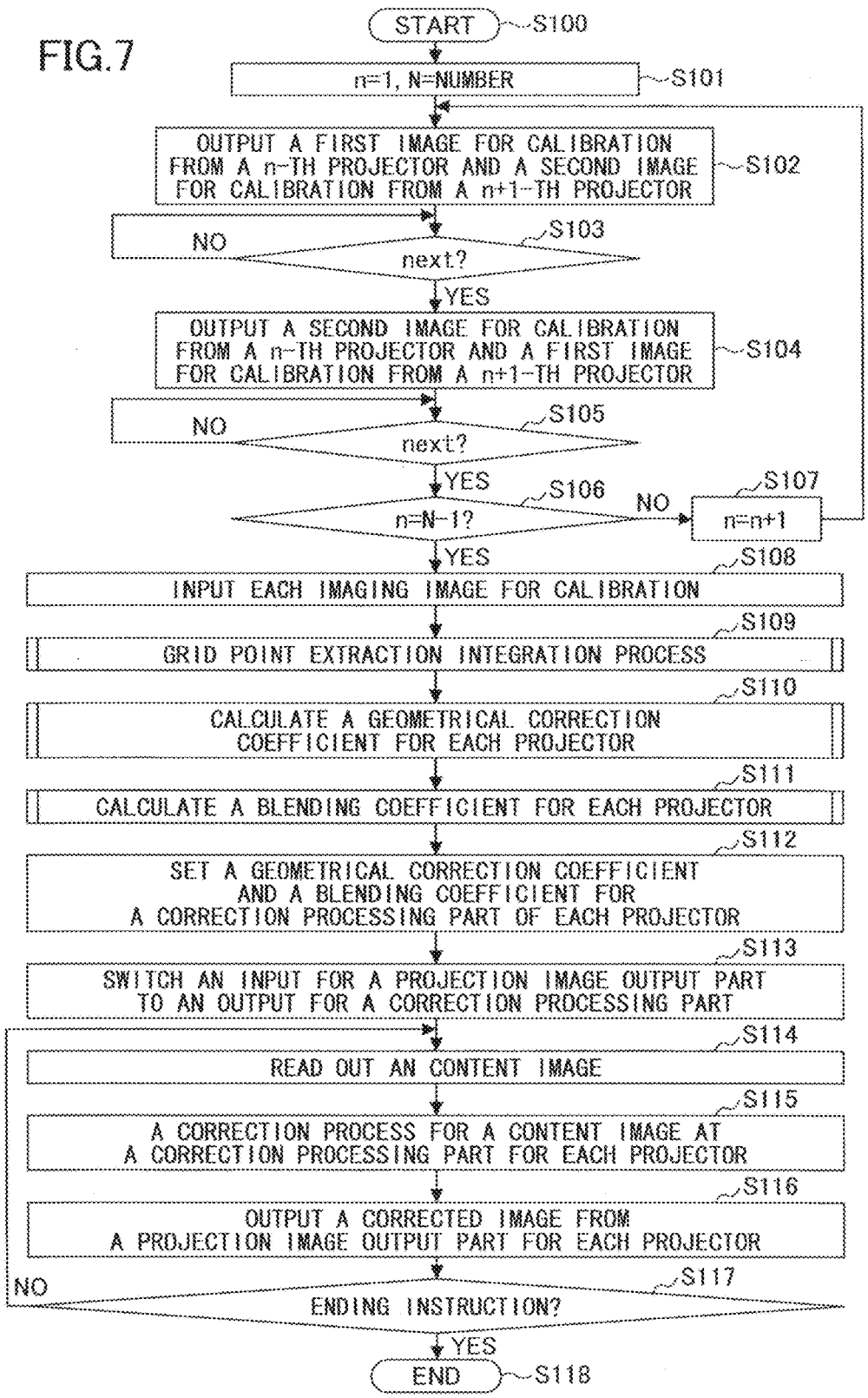

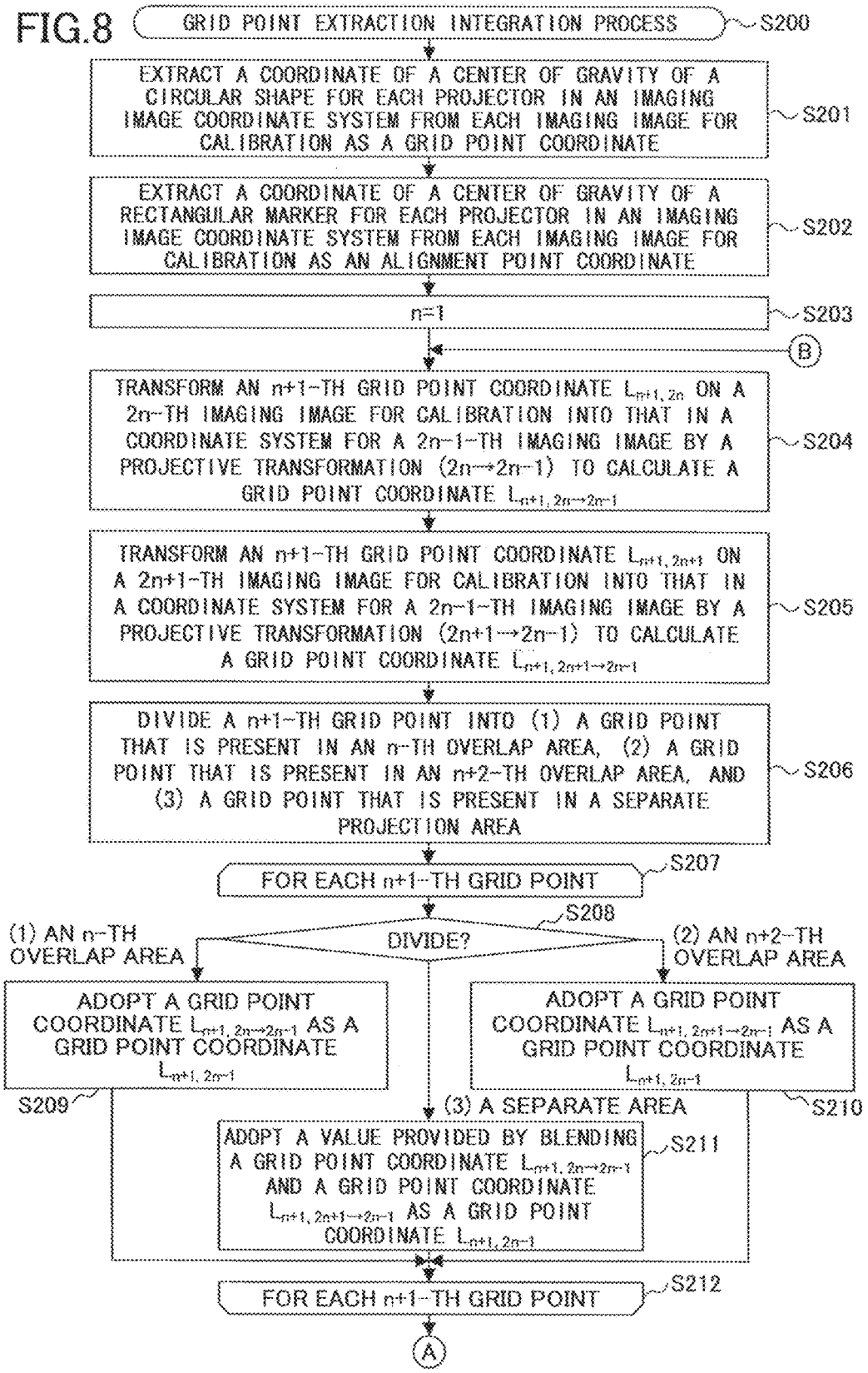

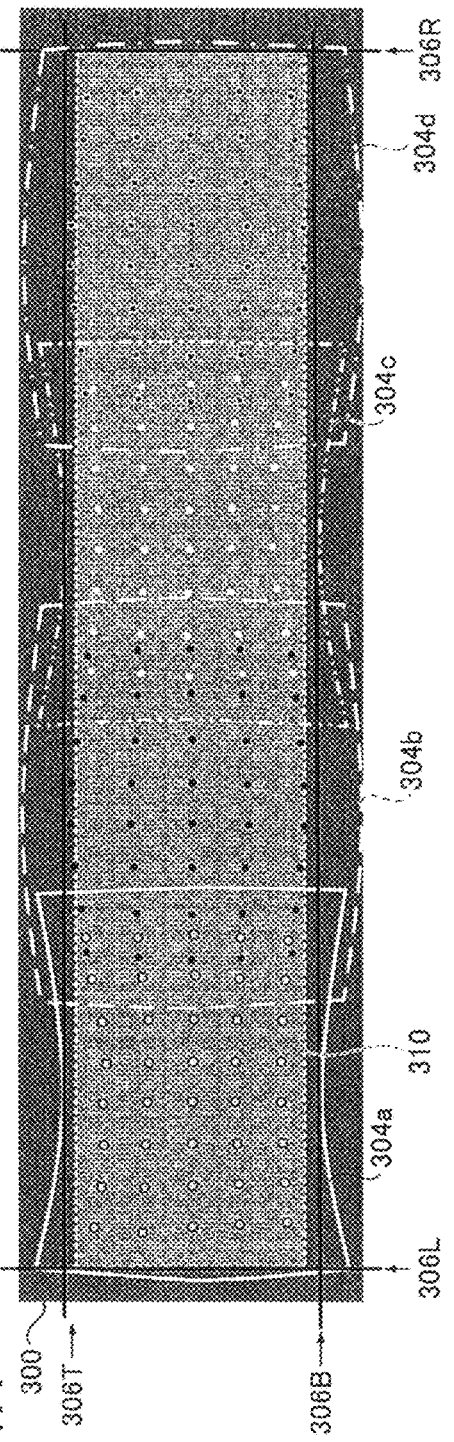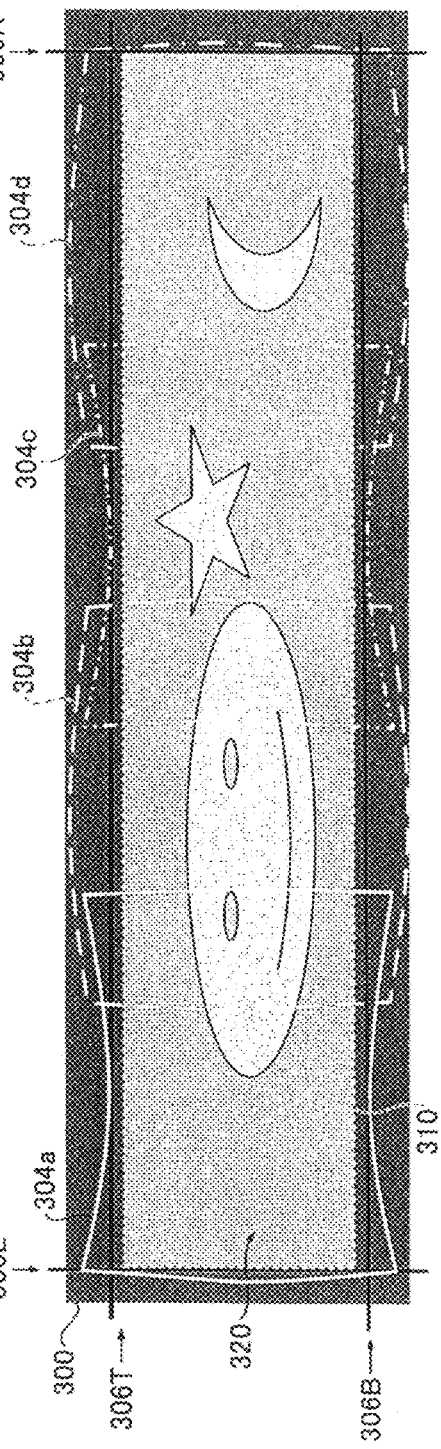

FIG.21A

| PROJECTOR COORDINATE (INTEGER NUMBER) | | CONTENT COORDINATE (DECIMAL NUMBER) | |
|---|---|---|---|
| X | Y | X | Y |
| 0 | 0 | ... | ... |
| 1 | 0 | ... | ... |
| 2 | 0 | ... | ... |
| ... | ... | ... | ... |
| 1279 | 0 | ... | ... |
| 0 | 1 | ... | ... |
| 1 | 1 | ... | ... |
| 2 | 1 | ... | ... |
| ... | ... | ... | ... |
| 1277 | 799 | ... | ... |
| 1278 | 799 | ... | ... |
| 1279 | 799 | ... | ... |

FIG.21B

| PROJECTOR COORDINATE (INTEGER NUMBER) | | BLENDING COEFFICIENT |
|---|---|---|
| X | Y | |
| 0 | 0 | ... |
| 1 | 0 | ... |
| 2 | 0 | ... |
| ... | ... | ... |
| 1279 | 0 | ... |
| 0 | 1 | ... |
| 1 | 1 | ... |
| 2 | 1 | ... |
| ... | ... | ... |
| 1277 | 799 | ... |
| 1278 | 799 | ... |
| 1279 | 799 | ... |

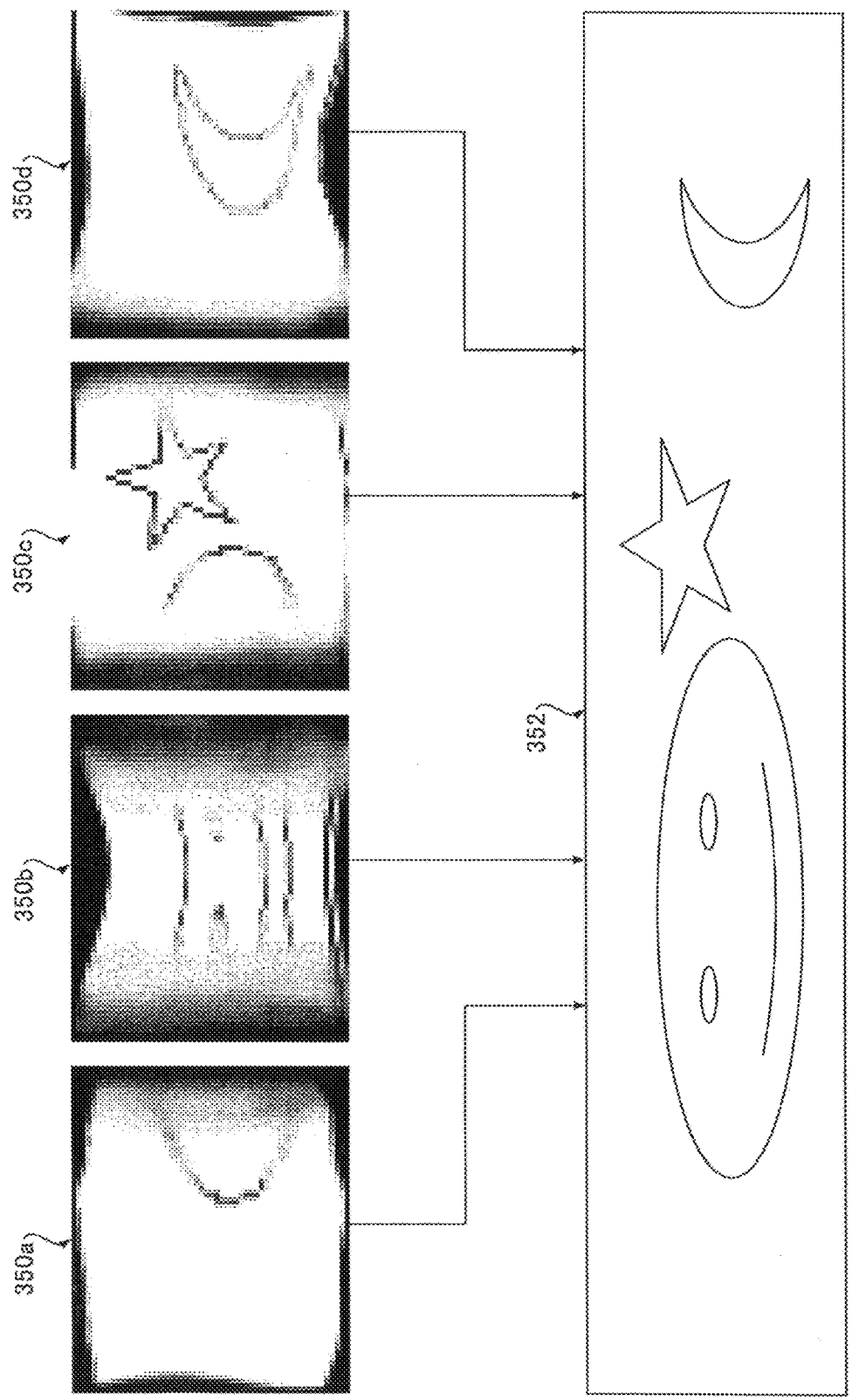

PROJECTION SYSTEM, IMAGE PROCESSING DEVICE, AND PROJECTION METHOD

BACKGROUND OF THE INVENTION

1. Field of the Invention

An aspect of the present invention relates to at least one of a projection system, an image processing device, and a projection method.

2. Description of the Related Art

Conventionally, attention has been attracted by a multi-projection technique for arranging projection images from a plurality of projectors so as to have mutually overlapping areas and thereby projecting one image onto a screen at a high resolution.

For example, the above-mentioned multi-projection technique is known by Japanese Patent No. 3,908,255. An image projection system in Japanese Patent No. 3,908,255 projects, from each projector onto a screen, a reference image that has four or more characteristic points with preliminarily known position coordinates. Herein, a reference image is a known image such as a grid pattern wherein, for example, bright spots or crosses are arranged at a constant interval. Then, positions of the above-mentioned characteristic points in a reference image that is imaged by a digital camera are detected, then a projection image for each projector is deformed based on such detected positions of four or more characteristic points for each projector, and an overlapping area is detected to execute a blending process. Such deformed and blending-processed images from a plurality of projectors are projected onto and arranged on a screen so as to have a mutually overlapping area, and thereby, one image is projected at a high resolution.

In a case where the above-mentioned multi-projection is executed, it is necessary to project and image reference images from respective projectors sequentially or simultaneously for a position adjustment and a scale adjustment of projection images. However, in a method that sequentially projects and images more than one reference image from respective projectors according to a conventional technique, a camera has to be fixed on a tripod mount or the like and it is necessary to execute imaging in such a manner that projection ranges of all the projectors are inside an angle of view. Therefore, it is not sufficient because a mechanism such an a tripod mount is needed and convenience is lowered. Furthermore, as the number of projectors are increased, it may be difficult to image in projection ranges of all the projectors inside an angle of view at once. For example, such a case is multi-projection on a wall of a hallway or the like.

On the other hand, in a method that projects and images reference images from projectors simultaneously according to a conventional technique, structured patterns such as bright spots or crosses in reference images that are simultaneously projected from projectors are overlapped. Hence, assignment of these patterns has to be determined by image processing. Herein, in a case where patterns from projectors are combined, it is difficult to separate, or determine assignment of, such patterns.

Furthermore, Japanese Patent No. 3497805 discloses a technique for executing calibration based on divisional imaging without providing projection ranges of all the projectors inside an angle of view as mentioned above. However, it is necessary to control a position and an orientation of a camera accurately at a time of divisional imaging in order to integrate images divided by divisional imaging in Japanese Patent No. 3497805, so that a dedicated position control device is necessary for such a camera control. Therefore, a conventional technique based on divisional imaging in Japanese Patent No. 3497805 is not sufficient from the viewpoint of ease or cost of calibration. Furthermore, Japanese Patent No. 3497805 as mentioned above is silent with respect to a problem of overlapping of structured patterns.

Furthermore, in a case where divisional imaging is executed while an imaging direction or an imaging position is shifted, it is necessary to have corrected a lens distortion of a camera in addition to accurate controlling of such a position. For example, an object to be imaged that is common to images that have been imaged while an imaging position is shifted, is imaged at different positions of a lens, so that distortions are different in respective images. Hence, it is not sufficient from the viewpoint of an increased work load for correction of a lens distortion or an increased constraint on a camera capable of being used. Furthermore, a high flatness of a projection screen is also required. If there is an irregularity on a screen, a position of an object to be imaged that is common to images that have been imaged while an imaging direction or an imaging position is shifted, is shifted based on parallax. Hence, there is a problem of an increased constraint on a flatness of a screen or a degraded image quality. Japanese Patent No. 3497805 as mentioned above is silent with respect to such a problem in correction of a lens distortion or a flatness of a screen.

A technique for simultaneously projecting and imaging, and separating in a post-process, overlapping structured patterns in stack projection for overlapping and projecting onto a projection body images from a plurality of projectors is known from Japanese Patent Application Publication No. 2012-047849. A conventional technique in Japanese Patent Application Publication No. 2012-047849 discloses a method that projects patterns at respectively different wavelength regions such as R, G, and B from projectors or projecting patterns with different light polarization characteristics therefrom, and subsequently separating superimposed patterns based on a wavelength or a light polarization characteristic. However, in a method that projects patterns at different wavelength regions, wavelength regions of R, G, and B of a camera are not usually identical to wavelength regions of R, G, and B of a projector, so that it is not easy to separate independent color signals by using a normal camera. In a method that projects patterns with different light polarization characteristics, a dedicated imaging device is necessary and there is a problem of an increased cost.

In addition, Japanese Patent Application Publication No. 2011-182076 discloses a method that simultaneously projects and images a plurality of kinds of patterns with mutually shifted phases from a plurality of projectors while a pattern arrangement is designed so as not to overlap mutual patterns. However, it is necessary to project a pattern with a certain size in order to ensure precision of pattern extraction. On the other hand, it is necessary to decrease a pattern distance in a case where a spatial density of patterns is increased to improve precision of position adjustment. Furthermore, projection is made at a distance that is extremely close to a screen in an ultra-short focus projector that has appeared in recent years, so that a projection image is readily distorted non-linearly due to focus, a sensitive installation condition, or a fine irregularity of a screen. Because of these reasons, there is a limitation to a method for simultaneous projection and imaging by a plurality of projectors while mutual overlapping of patterns is avoided.

SUMMARY OF THE INVENTION

According to one aspect of the present invention, there is provided a projection system for projecting an image onto a projection body by a plurality of projection devices, including an image preparation unit configured to prepare a plurality of imaging images for calibration, a grid point extraction unit configured to extract a set of grid points that indicates a distortion of a projection image for at least one projection device from each of the plurality of imaging images for calibration, a grid point transformation unit configured to execute a transformation between a plurality of images that are imaged in different imaging ranges on the plurality of imaging images for calibration in such a manner that each set of the grid points that are commonly extracted for a subject projection device is provided in a common coordinate system, a grid point synthesis unit configured to produce a set of the grid points that are synthesized for a subject projection device based on a plurality of sets of the grid points in the common coordinate system, and a correction coefficient calculation unit configured to calculate a correction coefficient for a subject projection device based on a set of the synthesized grid points.

According to another aspect of the present invention, there is provided an image processing device for executing projection by using a plurality of projection devices, including an image preparation unit configured to prepare a plurality of imaging images for calibration, a grid point extraction unit configured to extract a set of grid points that indicates a distortion of a projection image for at least one projection device from each of the plurality of imaging images for calibration, a grid point transformation unit configured to execute a transformation between a plurality of images that are imaged in different imaging ranges on the plurality of imaging images for calibration in such a manner that each set of the grid points that are commonly extracted for a subject projection-device is provided in a common coordinate system, a grid point synthesis unit configured to produce a set of the grid points that are synthesized for a subject projection device based on a plurality of sets of the grid points in the common coordinate system, and a correction coefficient calculation unit configured to calculate a correction coefficient for a subject projection device based on a set of the synthesized grid points.

According to another aspect of the present invention, there is provided a projection method for projecting an image onto a projection body by a plurality of projection devices, including a step of causing a computer to prepare a plurality of imaging images for calibration, a step of causing a computer to extract a set of grid points that indicates a distortion of a projection image for at least one projection device from each of the plurality of imaging images for calibration, a step of causing a computer to execute a transformation between a plurality of images that are imaged in different imaging ranges on the plurality of imaging images for calibration in such a manner that each set of the grid points that are commonly extracted for a subject projection device is provided in a common coordinate system, a step of causing a computer to produce a set of the grid points that are synthesized for a subject projection device based on a plurality of sets of the grid points in the common coordinate system, and a step of causing a computer to calculate a correction coefficient for a subject projection device based on a set of the synthesized grid points.

BRIEF DESCRIPTION OF THE DRAWINGS

FIG. 6A, FIG. 6B, FIG. 6C, FIG. 6D, FIG. 6E, FIG. 6F, FIG. 6G, and FIG. 6H are diagrams that illustrate an influence of an irregularity of a screen that is caused in images that are imaged from different points of view.

FIG. 7 is a flowchart of a general process flow of a grid point extraction integration process, a process for calculation of each kind of correction coefficient, and a correction process based on such a correction coefficient, according to the present embodiment.

FIG. 8 is a flowchart (1/2) of a grid point extraction integration process to be executed by a grid point extraction integration part according to the present embodiment.

FIG. 17A and FIG. 17B are diagrams that illustrate projection ranges, post-correction projection target areas, and a projection content image of four projectors in an integrated coordinate system.

FIG. 21A and FIG. 21B are diagrams that illustrate data structures of a geometrical correction coefficient (FIG. 21A) and a blending coefficient (FIG. 21B).

FIG. 22 is a diagram that illustrates a correction process based on a correction coefficient to be executed by a correction process part according to the present embodiment.

DETAILED DESCRIPTION OF THE PREFERRED EMBODIMENTS

The present embodiment will be described below, wherein the present embodiment is not limited to embodiments described below. Here, in embodiments described below, one example of a projection system will be described by using a projection system that includes a plurality of projectors that are projection means, one camera that is an imaging means, and an image processing device for executing overall control.

(General Configuration)

Figure 1:
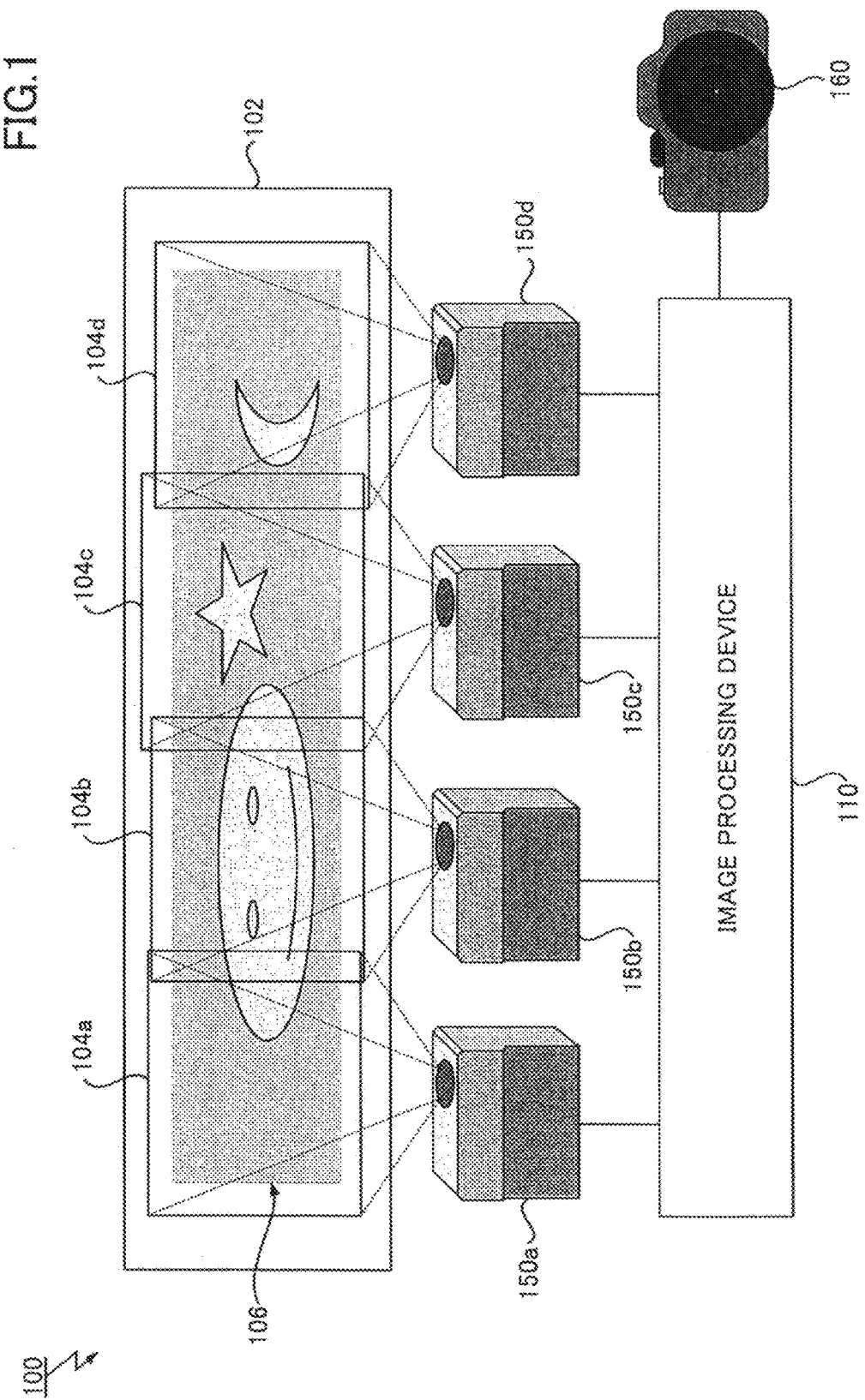
FIG. 1 is a schematic diagram of a general configuration of a projection system according to the present embodiment.

FIG. 1 is a schematic diagram that illustrates a general configuration of a projection system 100 according to the present embodiment. The projection system 100 illustrated in FIG. 1 is configured to include an image processing device 110 for executing overall control of such a system, a plurality of projectors 150, and a camera 160. Here, in a described embodiment, the projection system 100 is configured to be adapted to a so-called large-screen multi-projection wherein projection images from four projectors 150a-150d are synthesized on a projection surface to project an image onto an area greater than a case of a single projector.

The image processing device 110 is typically configured as a general-purpose computer such as a personal computer or a workstation. Here, the image processing device 110 is not limited to a general-purpose computer and may be installed as a dedicated controller or may be incorporated in any one of the projectors 150.

Each of the projectors 150 is a projection device that adopts a liquid crystal method, a Cathode Ray Tube (CRT) method, a Digital Light Processing (DLP) method, a Liquid-Crystal-On-Silicon (LCOS) method, or the like. The camera 160 is an imaging device that includes an image sensor such as Complementary Metal Oxide Semiconductor (CMOS) or CCD (Charge Coupled Device) and an imaging optical system such as a lens for imaging (forming an image) on a light-receiving area of such an image sensor. The camera 160 may be configured as a dedicated device such as a WEB camera, a digital steel camera or a digital video camera, or may be configured as a device incorporated in a general-purpose device such as a smartphone terminal or a tablet terminal.

In the present projection system 100, a screen 102 is placed that is a projection body for providing a projection surface. Each of the projectors 150 is placed to execute projection on the screen 102 while a position of a center of projection is changed. The image processing device 110 produces a plurality of projection images that are projected by the plurality of projectors 150a-150d and outputs respective projection images to respectively corresponding projectors 150. Each of the projectors 150 projects a projection image inputted from the image processing device 110 onto the screen 102. As illustrated in FIG. 1, a plurality of projection images 104a-104d are projected onto the screen 102 from the plurality of projectors 150a-150d, respectively. Such plurality of projection images 104a-104d are overlapped on a projection surface to be synthesized as a single projection image 106.

The projection system 100 uses the plurality of projectors 150a-150d to project the single projection image 106, as described above, in a projection mode, wherein a calibration process is usually executed before the projection mode described above. The camera 160 illustrated in FIG. 1 is used for such a calibration process. The image processing device 110 outputs an image for calibration to each of the plurality of projectors 150 in a calibration mode, and projects a projection image for calibration onto the screen 102. Then, a point of view and a field of view of a camera are set in such a manner that projection images 104 projected onto the screen 102 by predetermined projectors 150 are included in an angle of view of the camera 160, and imaging for calibration is executed more than once.

Each imaging image that is imaged by the camera 160 (wherein an imaging image with a projection image for calibration being included therein will be referred to as an imaging image for calibration, below) is transmitted to the image processing device 110 through a wireless connection such as wireless Local Area Network (LAN), Bluetooth (registered trademark), or wireless Universal Serial Bus (USB), or a wire connection such as wire USB or wire LAN. Alternatively, an imaging image for calibration that is imaged by the camera 160 is read by the image processing device 110 through a removable medium such as an SD card or Compact Flash (registered trademark).

The image processing device 110 calculates various kinds of correction coefficients for executing a position adjustment, a scale adjustment, a distortion correction, a brightness adjustment of an overlap area, or the like, for a projection image from each of the plurality of projectors 150a-150d, by using a plurality of inputted imaging images for calibration. The image processing device 110 produces a projection image corrected to be projected by each of the projectors 150a-150d, based on the kinds of calculated correction coefficients in a projection mode. A calculation process for each kind of correction coefficient and a correction process based on such a correction coefficient will be described below, with reference to FIG. 2 to FIGS. 6A-6H (Functional Configuration)

Figure 2:
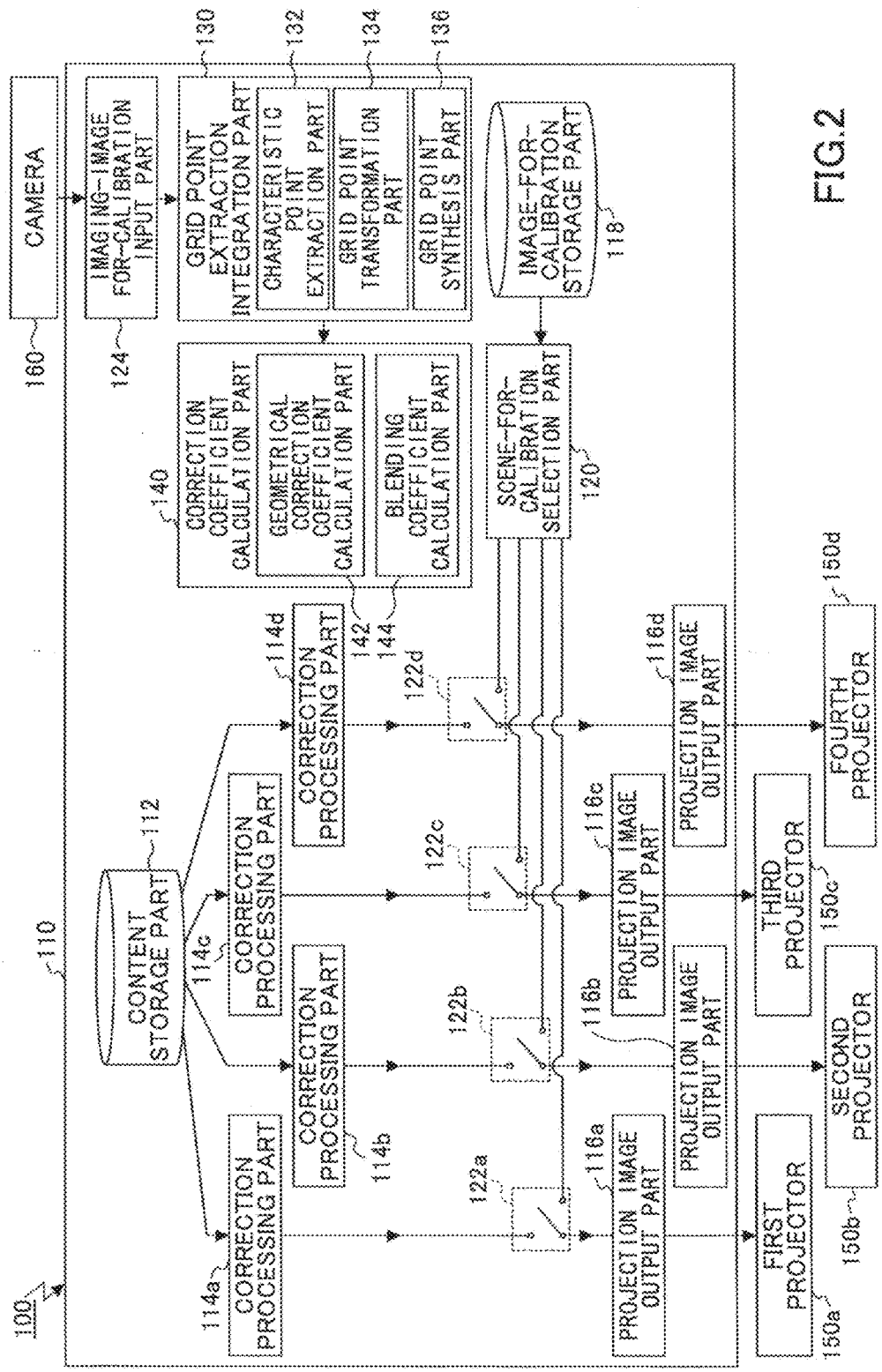
FIG. 2 is a functional block diagram of a projection system according to the present embodiment.

FIG. 2 is a functional block diagram of the projection system 100 according to the present embodiment. The system 100 illustrated in FIG. 2 includes a plurality of functional blocks that operate on the image processing device 110. The image processing device 110 is configured to include a content storage part 112, correction processing parts 114a-114d for respective projectors, projection image output parts 116a-116d for respective projectors, and switching parts 122a-122d for respective projectors. The image processing device 110 is further configured to include an image-for-calibration storage part 118, a scene-for-calibration selection part 120, an imaging-image-for-calibration input part 124, a grid point extraction integration part 130, and a correction coefficient calculation part 140.

The content storage part 112 stores a content image that is an object to be projected as the single projection image 106. The content storage part 112 is configured as a memory zone such as a Hard Disk Drive (HDD), a Solid State Drive (SSD), or an attachable and detachable removable medium. Here, a content image that is an object to be projected may be provided as a display screen in a case where a file is executed on an application such as a presentation, may be provided as a static image file, or may be provided as a frame at an arbitrary timing in a dynamic image file. Furthermore, a content image may be provided as a screen that is produced by executing an operating system or a video image that is inputted externally. For convenience of illustration, a case where a content image is provided as a static image will be described as an example below.

The correction processing parts 114a-114d are provided to correspond to the projectors 150a-150d that are included in the system 100. Each of the correction processing parts 114 reads a content image from the content storage part 112, applies a correction process thereto, and produces a projection image for a corresponding projector 150. Here, a process that is executed by each of the correction processing parts 114 will be described in detail later.

The projection image output parts 116a-116d are provided to correspond to the projectors 150a-150d that are included in the system 100. Each of the projection image output parts 116 is configured to include a display output that is connected to the corresponding projector 150, and an input image that is selected by the switching part 122 is video-outputted to the connected projector 150.

The switching parts 122a-122d switch image flows depending on an operation mode of such a system 100. In a projection mode for projecting a content image, the switching parts 122 switch input sides thereof to outputs of the correction processing parts 114. Accordingly, each of the projection image output parts 116 video-outputs a processing result by a corresponding correction processing part 114 based on a content image. On the other hand, in a calibration mode, the switching parts 122 switch input sides thereof to outputs of the scene-for-calibration selection part 120 described later. Accordingly, each of the projection image output parts 116 video-outputs an image for calibration that is selected by and outputted from the scene-for-calibration selection part 120.

The image-for-calibration storage part 118 stores images for calibration that are to be projected from the projectors 150 in a calibration mode. The image-for-calibration storage part 118 is configured as a memory zone such as a HDD, an SSD, or an attachable and detachable removal medium. An image for calibration is typically provided as a static image that is preliminarily prepared.

Figure 3A:
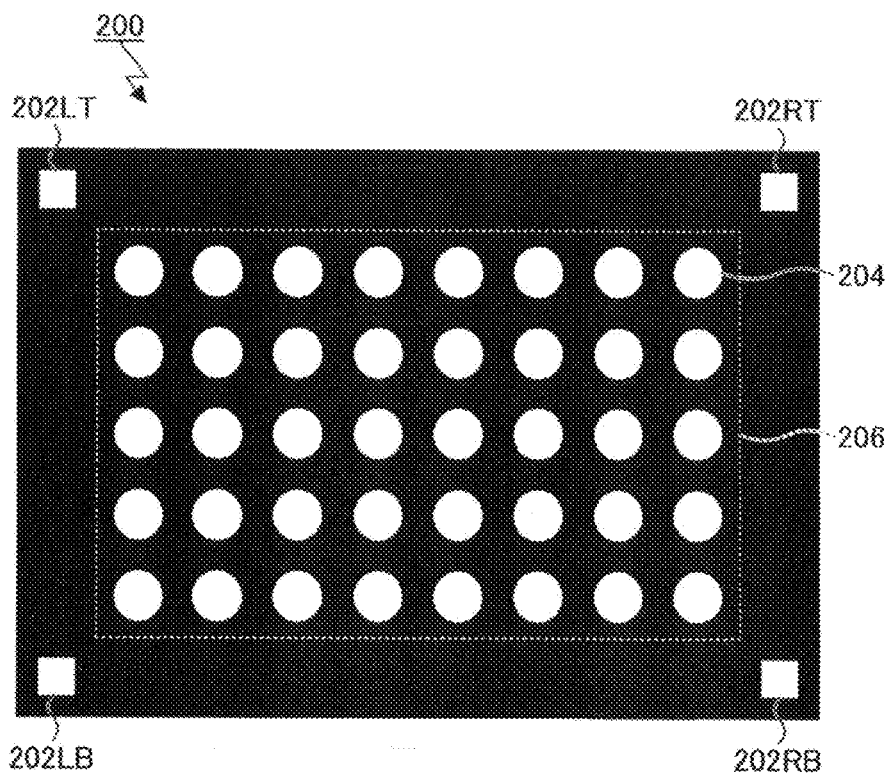
FIG. 3A and FIG. 3B are diagrams that illustrate two kinds of images for calibration to be used in a projection system according to the present embodiment.
Figure 3B:
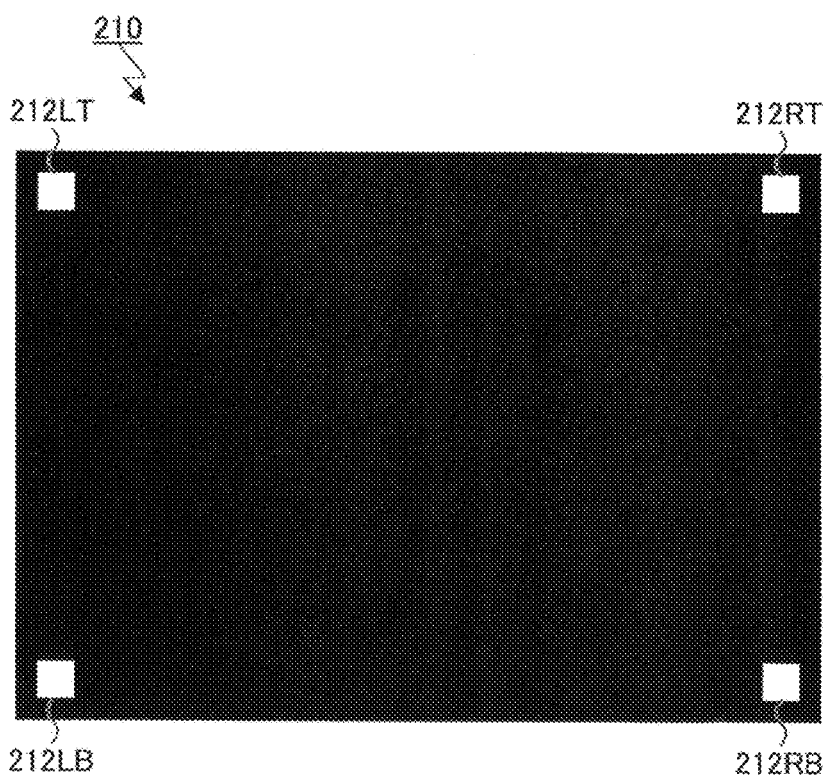

Herein, an image for calibration includes one or both of a grid pattern for specifying a grid point of a projection image and a position adjustment pattern for specifying a position adjustment point of such a projection image. FIG. 3A and FIG. 3B are diagrams that illustrate two kinds of images for calibration that are used in the projection system 100 according to the present embodiment. FIG. 3A illustrates a first image for calibration 200 that includes both a position adjustment pattern 202 and a grid pattern 206. FIG. 3B illustrates a second image for calibration 210 that includes only a position adjustment pattern 212.

The grid pattern 206 specifies coordinates on a projector memory and is configured as a pattern provided by arranging arbitrary graphical elements according to a predetermined rule. It is possible to detect a trapezoidal distortion or a local distortion of a projection image by imaging the grid pattern 206 that is projected onto the screen 102 and extracting grid points thereof. In the first image for calibration 200 illustrated in FIG. 3A, the grid part 206 is used wherein entire projection areas of the projectors are divided into ten blocks longitudinally and seven blocks transversely and white solid circles 204 on black backgrounds are arranged on central 8×5 blocks thereof in a grid form.

The position adjustment pattern 202 or 212 specifies a reference position (position adjustment position) of a projection image in images that are imaged for calibration and is configured in such a manner that a plurality of arbitrary graphic elements are arranged at predetermined positions. Imaging is executed more than once to include a common position adjustment patterns 202 or 212 that is projected onto the screen 102, so that it is possible to attain position adjustment of a plurality of imaging images.

The position adjustment pattern 202 or 212 preferably includes a marker that is arranged at a position outside an area with the grid pattern 206 being arranged therein (an area wherein a grid pattern is arranged if it is included), as illustrated in FIG. 3A and FIG. 3B. As a marker is provided outside the grid pattern 206, projection is readily executed so as not to overlap a grid pattern with a position adjustment pattern.

Although a specific pattern is described with reference to FIG. 3A and FIG. 3B, the grid pattern 206 or the position adjustment pattern 202 or 212 is not particularly limited. For a grid pattern, it is possible to use a variety of patterns such as a dot pattern, a checker pattern, and a lattice pattern, in addition to a polka dot pattern wherein circular shapes that have contrast against a background are arranged two-dimensionally as illustrated in FIG. 3A. A method for dividing entire projection areas of the projectors 150 is also not limited to the embodiment described above, and it is sufficient to determine the number of divisions of an area and a method for dividing an area, depending on required precision or performance of the image processing device 110. A shape of a marker for a position adjustment pattern may also be an arbitrary graphic element such as a circular shape and it is also sufficient for the number of markers to be at least four. Here, as the number of markers for position adjustment is increased, it is possible to improve precision of position adjustment.

Herein, FIG. 2 will be referred to again. In a calibration process according to the present embodiment, imaging of a grid pattern for detecting a geometrical distortion of a projection image from each of the projectors 150 is divisionally executed more than once and a plurality of results of imaging are integrated based on a position adjustment pattern. The scene-for-calibration selection part 120 reads each image for calibration from the image-for-calibration storage part 118 described above and selects and outputs a suitable image for calibration for each of the plurality of projectors 150a-150d. The scene-for-calibration selection part 120 holds a positional relationship between projection images from the plurality of projectors 150 and an image for calibration is selected at each step of a calibration process so that it is possible to obtain a result of calibration for each of the projectors 150 without excess or deficiency as a whole. A scene that is configured to include images for calibration to be projected from one or more projectors 150 at each step of a calibration process will be referred to as a projection scene for calibration below.

An image for calibration depending on a projection scene for calibration is projected from each of the projectors 150 by the scene-for-calibration selection part 120. At this time, a user uses the camera 160 to execute imaging for each projection scene for calibration in such a manner that a projected projection image for calibration is provided inside an angle of view. The imaging-image-for-calibration input part 124 receives an input of each imaging image from the camera 160 through a wireless connection, a wire connection, or a removable medium and prepares a plurality of imaging images for calibration.

Here, a user is requested to face a screen correctly and execute imaging in at least one projection scene for calibration. In a described embodiment, a first imaging is executed by using a level or the like to face a screen correctly. Integration of results is executed on a basis of an imaging image for calibration that is imaged by correctly facing such a screen 102. Here, at a time of each imaging in a second and later imaging, it is preferable to execute imaging of two projection images for an object to be imaged on a screen so as not to greatly depart from correct facing.

Figure 4:
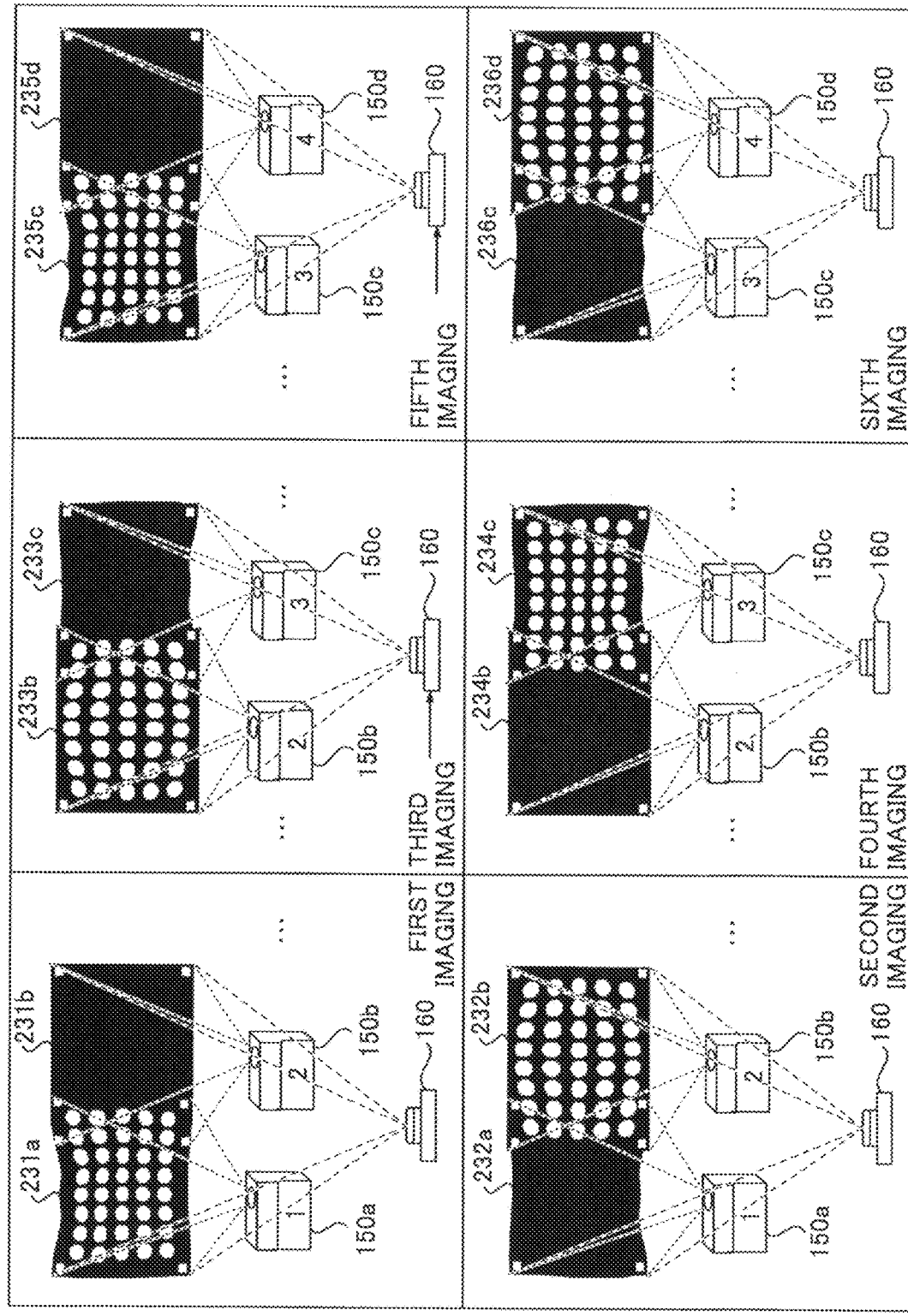
FIG. 4 is a diagram that illustrates projection scenes for calibration to be sequentially selected by a scene-for-calibration selection part according to the present embodiment and a method for imaging thereof.

FIG. 4 is a diagram that illustrates projection scenes for calibration that are sequentially selected by the scene-for-calibration selection part 120 and a method for imaging thereof. In an embodiment wherein the four projectors 150a-150d are used as illustrated in FIG. 1, it is possible to configure projection scenes for calibration in the aspect illustrated in FIG. 4 and prepare imaging images for calibration.

As illustrated in FIG. 4, six projection scenes for calibration that correspond to imaging six times are prepared in the described embodiment. For a first projection scene for calibration (first imaging), the first projector 150a projects the first image for projection 200 illustrated in FIG. 3A and the second projector 150b projects the second image for calibration 210 illustrated in FIG. 3B. At this time, the third and fourth projectors 150c and 150d execute no projection. For this first projection scene for calibration, a user provides projection images 231a and 231b from the first and second projectors 150a and 150b inside a field of view of the camera and executes imaging thereof.

For a second projection scene for calibration (second imaging) opposing the first scene, the first projector 150a projects the second image for calibration 210 illustrated in FIG. 3B and the second projector 150b projects the first image for calibration 200 illustrated in FIG. 3A. At this time, the third and fourth projectors 150c and 150d execute no projection, similarly to the first scene. For the second projection scene for calibration, a user executes imaging in an imaging range that is generally identical to that of the first scene.

Herein, imaging in a generally identical imaging range refers to imaging without changing a point of view, an orientation, or an angle of view of a camera in such a manner that a projection range for an identical projector is imaged with a generally identical composition and position in an imaging screen. For the second scene, imaging is executed in such a manner that projection images 232a and 232b from the first and second projectors 150a and 150b are imaged in an imaging image, with a composition, a position, and a size that are generally identical to those of the first scene. Here, changes of a point of view, an orientation and an angle of view of a camera are allowed that could be caused in a case of handheld imaging when a user intends to execute imaging with an identical composition.

For a third projection scene for calibration (third imaging) or later, a combination of two adjacent projectors 150 is changed for arrangement of projection images, and two sets of scenes that are projected by switching between the first image for calibration 200 and the second image for calibration 210 are prepared for each combination. As a result, projection scenes for calibration are prepared by a number that is two multiplied by the number of combinations of two adjacent projectors 150.

In a case where four projector are used as illustrated in FIG. 4, two sets of, totally six, projection scenes for calibration are prepared for each of three combinations, namely, first and second projectors, second and third projectors, and third and fourth projectors. As illustrated in FIG. 4, imaging of each projection scene for calibration is executed while an imaging position of the camera 180 is moved and an imaging range is shifted among different combinations in such a manner that projection ranges of two adjacent projectors 150 in each combination described above are included.

Herein, imaging in different imaging ranges refers to imaging with changing both or one of a point of view and an orientation of a camera in such a manner that a combination of projectors with a projection range that is provided inside an imaging range of the camera 160 is changed. Here, no substantial imaging range may be changed depending on changes in a point of view, an orientation and an angle of view of a camera that could be caused in a case where a user intends on imaging with an identical composition and executes handheld imaging.

Here, six projection scenes for calibration that are adapted to the four projectors 150a-150d for aligning projection images in a horizontal direction have been described with reference to FIG. 4. As generalization to N (N≥3) projectors 150 is provided, it is sufficient to configure the number of combinations (N−1)×2 sets of projection scenes for calibration as described below.

That is, for arrangement of projection images in a 2n−1 (1≤n≤N−1)-th projection scene for calibration, one of adjacent projectors (an n-th projector) projects an image for calibration that includes a position adjustment pattern and a grid pattern as illustrated in FIG. 3A (wherein a first projector is not necessarily required to include a position adjustment pattern). Then, the other (n+1-th) of the adjacent projectors described above is configured to project an image for calibration that includes only a position adjustment pattern as illustrated in FIG. 3B. On the other hand, for arrangement of projection images in 2n(1≤n≤5 N−1)-th projection scene for calibration, the other (n+1-th) described above in adjacent projectors is configured to project an image for calibration that includes a position adjustment pattern and a grid pattern as illustrated in FIG. 3A.

In the aspect described above, an area that is included by the camera 160 in first imaging is at most a projection range for two projectors, and hence, even if the number N is increased, a constraint on a depth for the screen 102 is mitigated. Here, a case where projection images are aligned in a vertical direction is also similar thereto.

Herein, FIG. 2 is referred to again. The grid point extraction integration part 130 extracts a grid point of an imaged grid pattern from each imaging image for calibration that is prepared by the imaging-image-for-calibration input part 124 to correspond to the projection scene for calibration described above. Herein, each imaging image for calibration and the projection scene for calibration described above being caused to correspond thereto are provided in the imaging-image-for-calibration input part 124. More specifically, the grid point extraction integration part 130 is configured to include a characteristic point extraction part 132, a grid point transformation part 134, and a grid point synthesis part 136.

The characteristic point extraction part 132 extracts a characteristic point from each of a plurality of prepared imaging images for calibration. It is possible for a characteristic point that is extracted herein to include a grid point that corresponds to a grid pattern for detecting a distortion of a projection image and a position adjustment point that corresponds to a position adjustment pattern for position adjustment among images for calibration. The characteristic point extraction part 132 constitutes a grid point extraction means and a position adjustment extraction means in the present embodiment.

Figure 5:
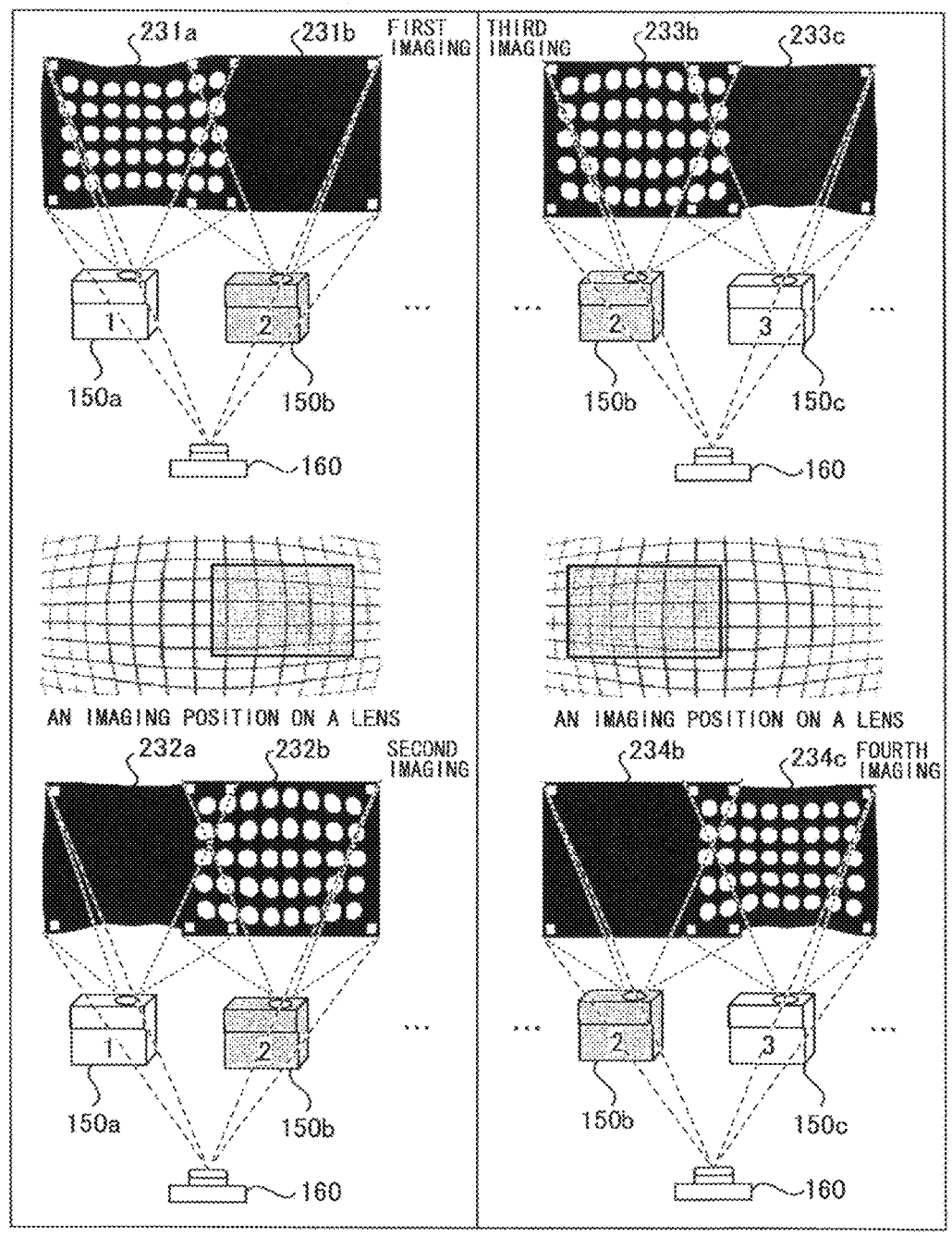
FIG. 5 is a diagram that illustrates an influence of a lens distortion that is caused in images that are imaged at different imaging ranges.

An influence on a grid point that indicates a distortion of a projection image described above, that is caused by a lens distortion of the camera 160 or a difference in a direction of a line of sight of the camera 160, will be considered below, with reference to FIG. 5 and FIGS. 6A, 6B, 6C, 6D, 6E, 6F, 6G, and 6H. FIG. 5 is a diagram that illustrates an influence of a lens distortion that is caused among images that are imaged in different imaging ranges. In a case where a lens distortion of the camera 160 is not sufficiently calibrated, each imaging image is subjected to an influence of a lens distortion. This image distortion depends on a position in an imaging image as illustrated in FIG. 5.

Imaging ranges are generally identical between imaging images for calibration for first imaging and second imaging, and hence, for example, as attention is paid to a projection image from the second projector 150b, distortions that are subjected to by projection images 231b and 232b thereof are generally identical. On the other hand, a projection image 232b and a projection image 233b from a subject second projector between second imaging and third imaging in an imaging range different therefrom are imaged at different positions of a lens, and accordingly, subjected to different distortions in accordance with a lens distortion.

Because a grid point is utilized for correcting a distortion of a projection image from each projector 150, it is desirable to execute matching among the plurality of projectors 150 for a correction of a distortion in an overlapping projection area among the projectors 150. Otherwise, a shift of an image may be caused.

A grid point for the second projector 150b that is extracted from the projection image 232b at the second imaging described above exhibits a good compatibility with an imaged grid point of the projection image 231a for the first projector 150a at an immediate left at the first imaging with a generally identical imaging range. This is because an overlapping portion is subjected to an identical distortion. Therefore, as a geometrical distortion is corrected based on this grid point extracted from the projection image 232b at the second imaging, a difference is reduced between a projection image from the second projector 150b and a projection image from the first projector 150a that is corrected based on a grid point extracted from the projection image 231a at the first imaging.

On the other hand, a relationship with an imaged grid point for the third projector 150c at an immediate right that is extracted from the projection image 234c at the fourth imaging with a different imaging range is provided in a different situation. In this case, comparatively good compatibility is not exhibited because a grid point for the second projector 150b that is extracted from the projection image 232b at the second imaging described above and an imaged grid point of the projection image 234c for the third projector 150c at an immediate right at the fourth imaging with a different imaging range are subjected to different distortions at an overlapping portion thereof.

FIG. 6A, FIG. 6B, FIG. 6C, FIG. 6D, FIG. 6E, FIG. 6F, FIG. 6G, and FIG. 6H are diagrams that illustrate an influence of an irregularity of a screen that is caused among images that are imaged from different points of view. In a case where an image is projected onto a planar screen as illustrated in FIG. 6A, a view in a case of a correctly facing observation like FIG. 6C and a view in a case of an oblique observation like FIG. 6D are provided in a plane transformation. However, a case where an image is projected onto a screen with an irregularity as illustrated in FIG. 6B is provided in a different situation. In this case, a case of an oblique observation like FIG. 6D is such that a pattern present on a plane (a grey circle in the figure) and a pattern present on a portion displacing from such a plane (a white circle on a convex portion in the figure) are subjected to different deformations. Accordingly, a white circle at a convex portion is observed at a position that is shifted from a position expected by a plane transformation adapted to a pattern present on a plane (a grey circle in the figure).

Therefore, in a case of a screen with an irregularity, a grid point extracted from the projection image 232b for the second projector 150b at the second imaging described above does not exhibit a good compatibility with an imaged grid point of the projection image 234c for the third projector 150c at an immediate right at the fourth imaging from different points of view.

That is, in a case where a grid point for the second projector 150b at the second imaging is adopted, it is possible to reduce a shift with respect to a projection image from the first projector 150a but a shift with respect to a projection image from the third projector 150c is increased. On the other hand, in a case where a grid point for the second projector 150b at the third imaging is adopted, it is possible to reduce a shift with respect to a projection image from the third projector 150c but a shift with respect to a projection image from the first projector 150a is increased.

In regard to the former that is a lens distortion, it is sufficient to apply a correction to a lens distortion but a constraint on the camera that is used for calibration is increased. That is, additional labor is required in order to use a camera with a preliminarily measured lens distortion parameter or to measure a lens distortion parameter of a camera in situ. On the other hand, as work for measuring a lens distortion parameter is omitted, it is not possible to execute a calibration process at high precision because a lens distortion parameter is unknown, and image quality is degraded. In regard to the latter that is a distortion caused by parallax, an image is shifted on a screen with a low flatness so that image quality is degraded.

Hence, a configuration for executing correction that uses a plurality of sets of grid points extracted from a plurality of imaging images for calibration imaged on different imaging ranges is adopted for a subject projector among projectors for divisional imaging with different imaging ranges at both sides of alignment of projection images in the present embodiment.

The grid point transformation part 134 transforms a plurality of sets of grid points in the different imaging ranges described above (wherein each grid point at this stage is a point in a coordinate system of the imaging image for calibration) into those in a common coordinate system as a pretreatment of the synthesis described above, while a processing object is a subject processor 150 with projectors at both sides thereof and the both sides being subjected to divisional imaging. A coordinate transformation is executed based on a position adjustment point described above.

For example, in an example illustrated in FIG. 4, a projection image that includes a grid pattern for the second projector 150*b* with the first and third projectors 150*a* and 150*c* at both sides for divisional imaging with different imaging ranges is commonly imaged on second and third imaging images for calibration. A set of grid points in a second imaging image for this second projector 150*b* and a set of grid points in a third imaging image are objects to be processed.

A grid point on a second imaging image for the subject second projector 150*b* is transformed into that of a coordinate system of a first imaging image based on, for example, a position adjustment pattern for the second projector 150*b* that is commonly imaged in first and second imaging images. Similarly, a grid point in a third imaging image is also transformed into that of a coordinate system of a first imaging image based on a position adjustment pattern for a second projector that is commonly imaged in first and third imaging images. Thus, two sets of grid points in a common coordinate system are obtained. A similar matter also applies to the third projector 150*c* wherein the second and fourth projectors 150*b* and 150*d* for divisional imaging are provided at both sides thereof and a grid pattern is commonly imaged in fourth and fifth imaging images.

The grid point synthesis part 136 synthesizes a plurality of sets of grid points based on imaging with the different imaging ranges described above that are transformed into those of a common coordinate system by the grid point transformation part 134 and produces a set of synthesized grid points for a subject projector 150. Here, a process for synthesis of grid points will be described in detail below.

The grid point extraction integration part 130 transforms sets of grid points for all the projectors 150 into those in an integrated single coordinate system. Sets of grid points for all the projectors 150 include a set of synthesized grid points for projectors described above (for example, the second projector and the third projector) and a set of un-synthesized grid points for projectors with a projector adjacent to only one side thereof (for example, the first projector and the fourth projector). An integrated single coordinate system (that will be referred to as an integrated coordinate system below) is a coordinate system of a first imaging image for calibration that is imaged by correctly facing the screen 102 in the described embodiment.

The correction coefficient calculation part 140 calculates each kind of correction coefficient to be set for correction processing parts 114*a*-114*b* based on a set of grid points for each projector 150 in an integrated coordinate system. More specifically, the correction coefficient calculation part 140 includes a geometrical correction coefficient calculation part 142 for calculating a geometrical correction coefficient and a blending coefficient calculation part 144 for calculating a correction coefficient for blending projection images.

The geometrical correction coefficient calculation part 142 calculates a geometrical correction coefficient for a projector that provides a projection image projected from each of the plurality of projectors 150 based on grid points in an integrated coordinate system. A geometrical correction coefficient is a correction coefficient that incorporates a geometrical correction such as a position adjustment, a scale adjustment, or a distortion correction.

The blending coefficient calculation part 144 detects an overlap area between a projection image for a subject projector and a projection image for each projector adjacent to this subject projector, with respect to each of the plurality of projectors 150. The blending coefficient calculation part 144 calculates a blending coefficient for adjusting an overlap of these projection images based on a result of detection of an overlap area. Based on this blending coefficient for each projector, images are smoothly synthesized at a portion that overlaps projection images for the plurality of projectors 150 on the screen 102.

The correction processing part 114 produces a projection image for each projector from a content image based on each kind of correction coefficient that is calculated by each of the geometrical correction coefficient calculation part 142 and the blending coefficient calculation part 144.

Here, although the respective functional parts 112-144 that are realized in the single image processing device 110 have been described in the embodiment illustrated in FIG. 2, an embodiment of the projection system 100 is not limited to that illustrated in FIG. 2. In another embodiment, each of the correction processing parts 114*a*-114*d* may be realized on each of the projectors 150*a*-150*d* in order to reduce a load on an image processing device that is concentrated with an increase in the number thereof. In yet another embodiment, each of the functional parts 112-144 may be dispersedly installed in a plurality of image processing devices or all the functional parts 112-144 may be installed in any one of the projectors 150, while a single device may be configured to include a function of the image processing device 110 and functions of a plurality of projectors. Furthermore, in another embodiment, functions of the grid point extraction integration part 130 and the correction coefficient calculation part 140 may be installed as a server for providing a service through a network.

(Overall Process Flow)

An overall flow of a grid point extraction integration process, a calculation process for each kind of correction coefficient, and a correction process based on a correction coefficient will be described with reference to FIG. 7 below. FIG. 7 is a flowchart of an overall process flow of a grid point extraction process, a calculation process for each kind of correction coefficient, and a correction process based on a correction coefficient in accordance with the present embodiment. A process illustrated in FIG. 7 starts at step S100 in response to an instruction for starting a calibration process from a user.

At step S101, the image processing device 110 first sets a variable n for identifying an object to be processed at 1 and sets the number N of projectors 150 that are taking part in multi-projection. At step S102, a first image for calibration (that includes a grid pattern and a position adjustment pattern) is outputted from an n-th projector and a second image for calibration (that includes only a position adjustment pattern) is outputted from an n+1-th projector, so that an 2n-1-th projection scene for calibration is projected. Herein, a user executes imaging in such a manner that projected images for calibration for an n-th projector and a n+1-th projector are present inside an angle of view of the camera 160, for example, in accordance with guidance that is presented by the image processing device 110. At step S103, an explicit instruction from a user or an implicit instruction by passage of a predetermined period of time or the like, to go to a next process is awaited (during NO).

At step S103, if an instruction for next step is provided (YES), a process goes to step S104. At step S104, a second image for calibration (only a position adjustment pattern) is outputted from an n-th projector and a first image for calibration (that includes a grid pattern and a position adjustment pattern) is outputted from an n+1-th projector, so that a 2n-th projection scene for calibration is projected. At step S105, an explicit instruction from a user or an implicit instruction to go to a next process is awaited (during NO).

At step S105, if an instruction for next step is provided (YES), a process goes to step S106. At step S106, whether a variable n as an object to be processed reaches the number of combinations N−1 is determined. At step S106, if a determination is provided in such a manner that N−1 has not yet reached (NO), a process is branched to step S107 wherein the variable n is increased by 1, and the process is returned to step S102. At step S106, if a determination is provided in such a manner that the number of combinations N−1 is reached (YES), a process is branched to step S108.

At step S108, the image processing device 110 collectively receives inputs of a plurality of imaging images for calibration from the camera 160 and a process goes to step S109. Here, although inputs of a plurality of imaging images for calibration being received collectively have been described herein, inputs of imaging images for calibration may be sequentially received for respective imaging.

At step S109, the image processing device 110 executes a grid point extraction integration process by the grid point extraction integration part 130 described above, as described in detail later. In a grid point extraction integration process at step S109, extraction of a characteristic point from each imaging image for calibration, transformation of a plurality of sets of grid points to those in a common coordinate system, synthesis of the plurality of sets of grid points, and integration of all the sets of grid points in an integration coordinate system are executed. At step S110, the image processing device 110 calculates a geometrical correction coefficient for each projector based on coordinates of a grid point for each projector in an integration coordinate system, as described in detail later. At step S111, the image processing device 110 calculates a blending coefficient for each projector, as described in detail later.

At step S112, the image processing device 110 sets, for each correction processing part 114, a geometrical correction coefficient and a blending coefficient for each projector that are calculated at step S110 and step S111. At step S113, the image processing device 110 causes the switching part 122 to switch an input of the projection image output part 116 to an output of the correction processing part 114 and transfers to a projection mode.

The image processing device 110 reads a content image at step S114 and executes a correction process for the content image on the correction processing part 114 for each projector at step S115. At step S116, the image processing device 110 outputs a corrected projection image for each projector from the projection image output part 116 for each projector.

At step S117, the image processing device 110 determines whether an instruction for ending a projection mode is received from a user. At step S117, if a determination is provided in such a manner that an instruction for ending a projection mode is not received (NO), a process is looped through step S114 to update a projection image. If a dynamic image is provided, a process goes to a next frame. At step S117, if a determination is provided in such a manner that an instruction for ending a projection mode is received (YES), a process is branched to step S118 and ends the present process.

(Grid Point Extraction Integration Process)

Figure 9:
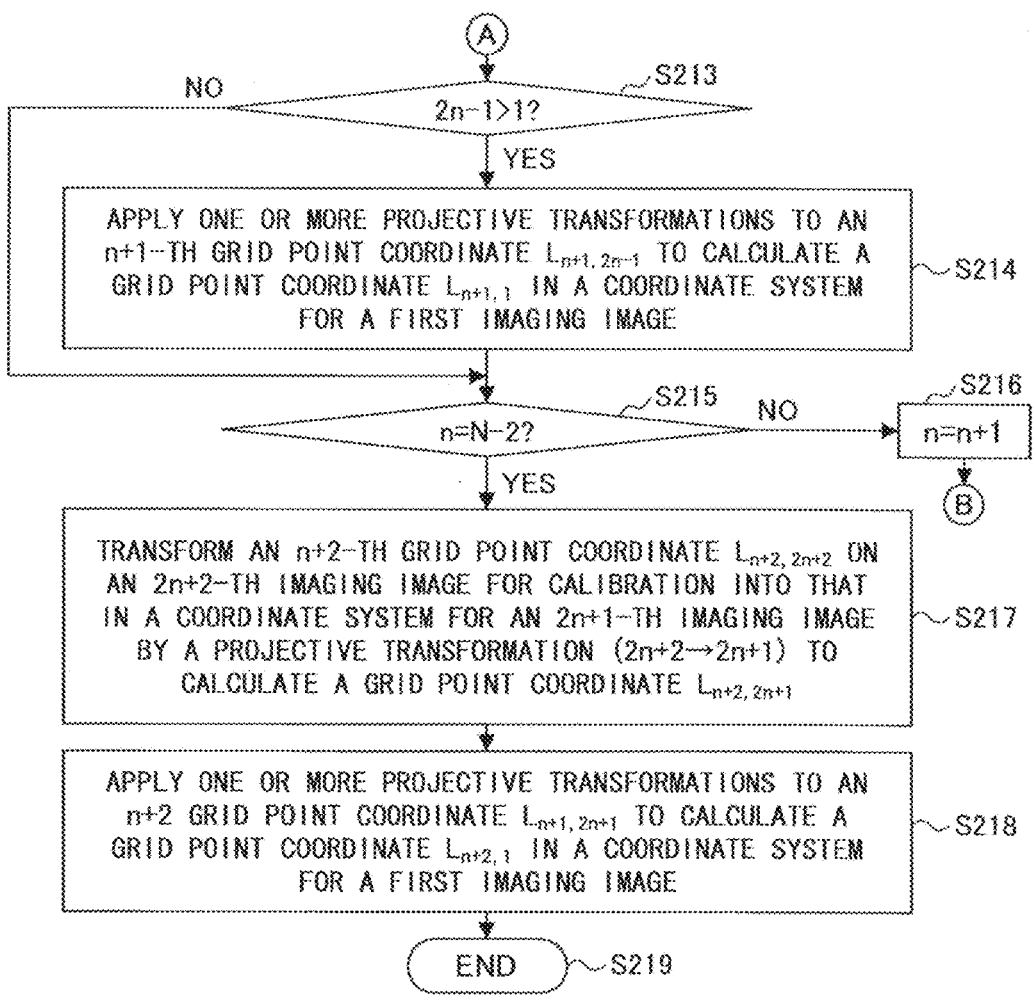
FIG. 9 is a flowchart (1/2) of a grid point extraction integration process to be executed by a grid point extraction integration part according to the present embodiment.

A grid point extraction integration process for each projector will be described in detail below, with reference to FIG. 8 to FIG. 14. FIG. 8 and FIG. 9 are flowcharts of a grid point extraction integration process to be executed by the grid point extraction integration part 130 according to the present embodiment. A process illustrated in FIG. 8 is called at step S109 illustrated in FIG. 7 and starts at step S200.

At step S201, the characteristic point extraction part 132 extracts, from each of a plurality of prepared imaging images for calibration, coordinates of a center of gravity of a circular shape in a projection image for a projector in each imaging image coordinate system, as grid point coordinates (at precision of a decimal). It is possible to calculate coordinates of a center of a gravity of a circular shape by, for example, binarizing an image, cutting out an image block in pattern matching or the like, and obtaining coordinates of a center of gravity thereof. Grid point coordinates for a grid pattern illustrated in FIG. 3A are calculated as an array of (x, y) coordinates for all of 8×5 grid points. $L_{i,j}$ denotes a grid point coordinate for an i-th projector in a j-th-imaging image for calibration below.

At step S202, the characteristic point extraction part 132 extracts, from each of a plurality of imaging images for calibration, coordinates of a center of gravity of a rectangular marker in a projection image from each projector in each imaging image coordinate system, as position adjustment point coordinates. Similarly, it is also possible to calculate coordinates of a center of gravity of a rectangular marker by, for example, binarizing an image, cutting out a white pixel block in patent matching or the like, and obtaining coordinates of a center of gravity thereof.

As the aspect illustrated in FIG. 4 is described more specifically, coordinates of centers of gravity of totally 8 sets of rectangular markers for 2nd-4th projectors are detected from 6 imaging images for calibration in coordinates systems of respective images. A marker for 2nd projector 150b, a marker for a 3rd projector, and a marker for a 4th projector are imaged and detected three times in 1st-3rd imaging images for calibration, three times in 3rd-5th imaging images for calibration, and twice in 5th-6th imaging images for calibration, respectively.

The following description will be provided as generalization for n-th (n≥3) projector 150. That is, a position adjustment point and a grid point for one of adjacent projectors (n-th projector) and also a position adjustment point for the other of the adjacent projectors (n+1-th projector) are extracted from a 2n−1-th imaging image for calibration (wherein a position adjustment pattern for a 1st projector is not necessarily required to be extracted). On the other hand, a position adjustment point and a grid point for the other of adjacent projectors (n+1-th projector) are extracted from a 2n-th imaging image for calibration.

Here, it is possible to identify a circular pattern for a projector and four rectangular markers for position adjustment for a projector in one imaging image for calibration by utilizing a mutual positional relationship. In a case where a projection scene for calibration is configured as illustrated in FIG. 4, a circular pattern for an n-th projector is present at a left side of a 2n−1-th scene and a circular pattern for an n+1-th projector is present at a right side of a 2n-th scene.

Furthermore, rectangular markers are present outside a circular pattern in any scene, wherein 8 rectangular markers for left and right adjacent projectors are present in an order of two left side rectangular markers for a left side projector, two left side rectangular markers for a right side projector, two right side rectangular markers for the left side projector, and two right side rectangular markers for the right side projector. Thus, it is possible to identify each of a circular pattern and a rectangular marker conveniently based on a positional relationship defined in each projection scene for calibration. Here, other than the positional relationship, for example, a color or a shape of an imaged rectangular marker may be identified by changing a color or a shape of a rectangular marker to be projected for each projector, and a determination may be executed based on such an identified characteristic.

At step S203, the grid point extraction integration part 130 initializes a variable n for identifying an object to be processed as 1. At step S204, the grid point transformation part 134 transforms grid point coordinates $L_{n+1,2n}$ for an n+1-th projector in a 2n-th imaging image for calibration onto a coordinate system for a 2n−1-th imaging image through projective transformation to calculate grid point coordinates $L_{n+1,2n \to 2n-1}$. Below, $L_{i,j \to k}$ denotes grid point coordinates for an i-th projector that are extracted from a j-th imaging image for calibration and transformed onto a coordinate system for a k-th imaging image. Herein, projective transformation is to execute transformation from a coordinate system for a 2n-th imaging image onto a coordinate system for a 2n−1-th imaging image.

Herein, $H_{2n \to 2n-1}$ denotes projective transformation for executing transformation from a coordinate system for a 2n-th imaging image onto a coordinate system for a 2n−1-th imaging image. It is possible to obtain a coefficient for projective transformation $H_{2n \to 2n-1}$ based on a set of position adjustment points for an n+1-th projector that are commonly imaged on 2n-th and 2n−1-th imaging images for calibration.

At step S205, the grid point transformation part 134 transforms grid point coordinates $L_{n+1,2n+1}$ for an n+1-th projector in a 2n+1-th imaging image onto a coordinate system for a 2n−1-th imaging image through projective transformation $H_{2n+1 \to 2n-1}$ to calculate grid point coordinates $L_{n+1,2n+1 \to 2n-1}$. Herein, it is possible to obtain a coefficient for projective transformation $H_{2n+1 \to 2n-1}$ based on a set of position adjustment points for an n+1-th projector that are commonly imaged in 2n+1-th and 2n−1-th imaging images for calibration.

Figure 10:
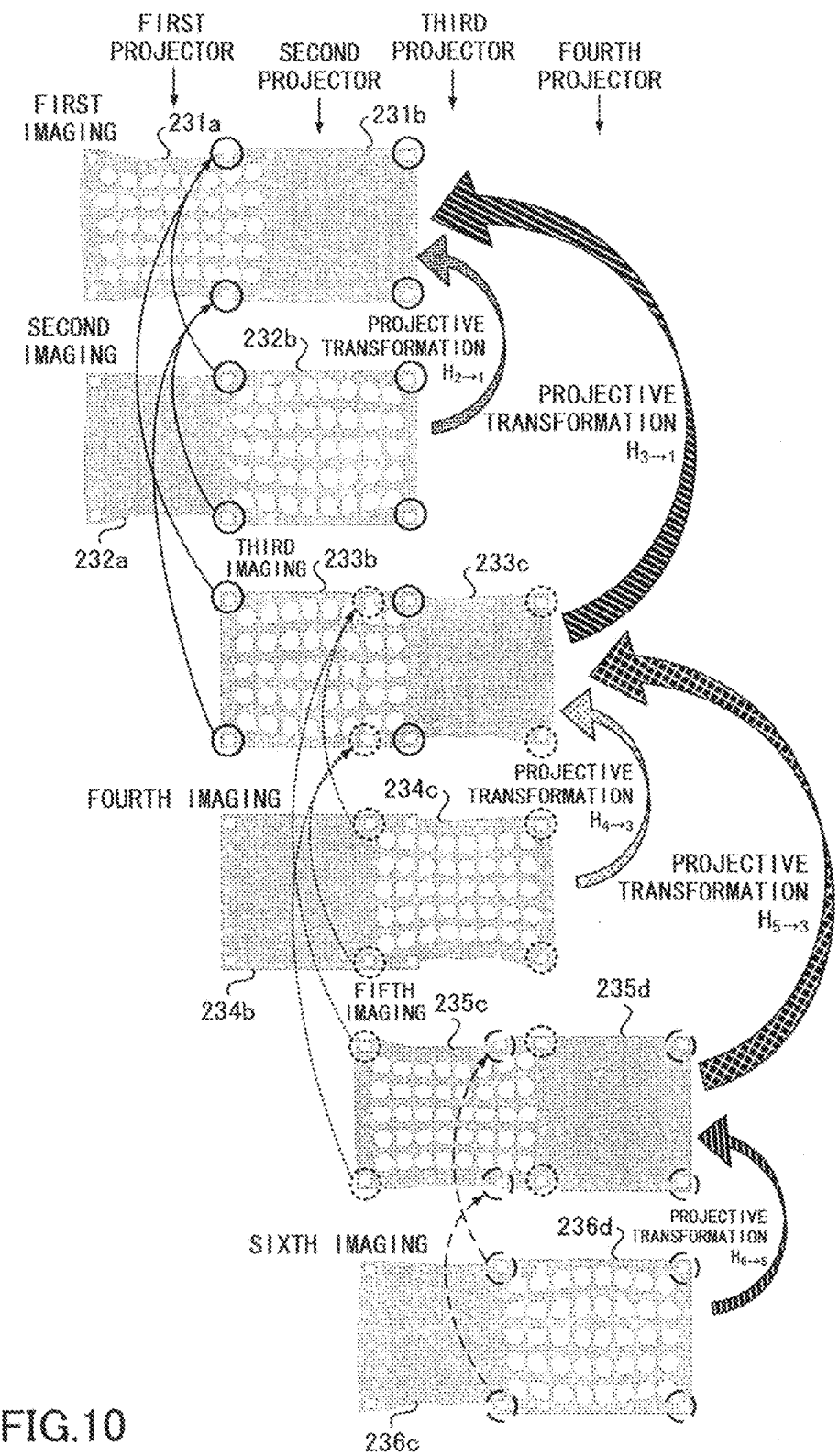
FIG. 10 is a diagram that illustrates six imaging images for calibration prepared by imaging projection scenes for calibration and a projective transformation to be obtained among these imaging images.

FIG. 10 is a diagram that illustrates 6 imaging images for calibration that are prepared by imaging each projection scene for calibration, and projective transformation that is obtained between these imaging images, in the aspect illustrated in FIG. 4. As illustrated in FIG. 10, a pair of position adjustment point coordinates of rectangular markers (indicated by solid line circles) for projection images 231b, 232b from the second projector 150b that are common between imaging images is obtained for a pair of 1st and 2nd imaging images. In this case, the grid point transformation part 134 calculates a coefficient for projective transformation $H_{2 \to 1}$ for executing transformation from a coordinate system for a 2nd imaging image onto a coordinate system for a 1st imaging image based on this pair of position adjustment point coordinates. Similarly, a coefficient for projective transformation $H_{3 \to 1}$ for executing transformation from a coordinate system for a 3rd imaging image onto a coordinate system for a 1st imaging image is calculated for a pair of 1st and 3rd imaging images for calibration, based on a pair of position adjustment point coordinates of rectangular markers (indicated by solid line circles) for projection images 231b, 233b from the 2nd projector 150.

Here, a similar matter also applies to projection images 233c, 234c, 235c for the 3rd projector 150c that are common between imaging images, for a pair of 3rd and 4th imaging images and a pair of 3rd and 5th imaging images.

A transformation formula for projective transformation is represented by the following formula (1):

$$u = \frac{x*a + y*b + c}{x*g + y*h + 1} \quad (1)$$

$$v = \frac{x*d + y*e + f}{x*g + y*h + 1}$$

and as fractions of formula (1) described above are cleared for simplification thereof, it is possible to be expanded into a first-degree polynomial represented by the following formula (2):

$$u = x*a + y*b + c - x*g*u - y*h*u$$

$$v = x*d + y*e + f - x*g*v - y*h*v \quad (2)$$

In formulas (1) and (2) described above, x, y represent plane coordinates before transformation and u, v represent plane coordinates after transformation, while 8 coefficients a-h represent coefficients for projective transformation. In the formulas described above, at least eight simultaneous equations are needed in order to calculate eight coefficients for projective transformation that are unknown parameters, wherein it is possible to produce eight transformation formulas in a case where four corresponding points for position adjustment in two imaging images for calibration are provided as described above. It is possible to obtain coefficients for projective transformation a-h by solving eight simultaneous equations produced from such four corresponding points of rectangular marks.

At step S206, the grid point synthesis part 136 divides grid points for a subject n+1-th projector in each predetermined area. More specifically, (1) those included in an area overlapping with a projection range for one or an n-th projector that is adjacent in an array of projection images, (2) those included in an area overlapping with a projection range for the other or an n+2-th projector, and (3) those included in a separate projection area for an n+1-th projector that is not included in any of both overlap areas, are determined among grid points for an n+1-th projector.

Figure 11:
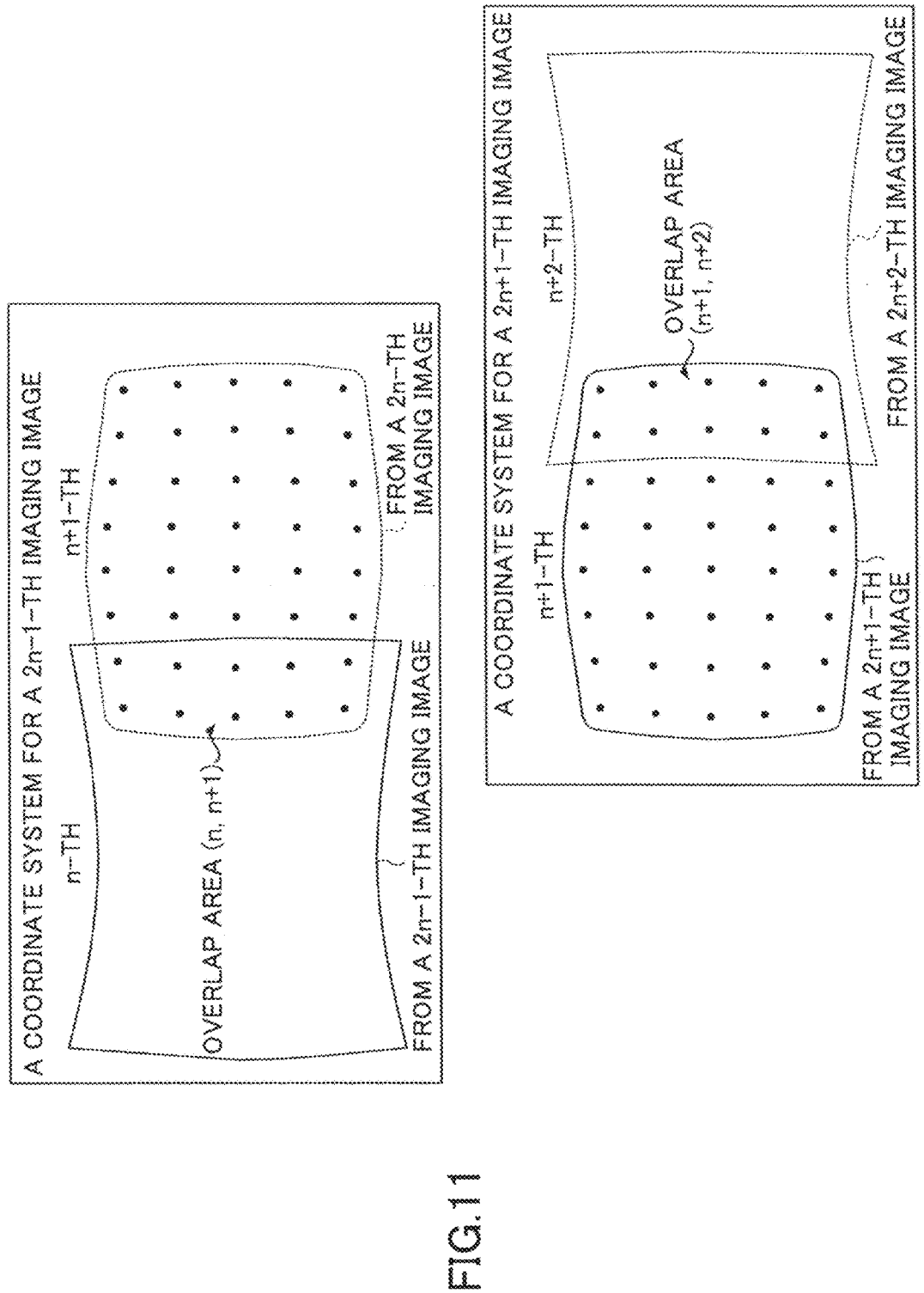
FIG. 11 is a diagram that illustrates a method for dividing grid points for a subject projector.

FIG. 11 is a diagram that illustrates a method for dividing grid points. It is possible to determine whether or not grid points for a subject n+1-th projector are included in an overlap area (n,n+1) with an immediate left n-th projector, as follows. First, an area (indicated by a solid line in FIG. 11) is obtained that is surrounded by a perimeter that is obtained by extrapolation from grid point coordinates for an n-th projector in a 2n−1-th imaging image. Then, whether or not grid point coordinates $L_{n+1,2n \to 2n-1}$ for an n+1-th projector 150 that are transformed by projective transformation $H_{2n \to 2n-1}$ are included in such an area is determined.

On the other hand, it is possible to determine whether or not they are included in an overlap area (n+1,n+2) with an immediate right n+2-th projector, as follows. An area (indicated by a dotted line in FIG. 11) is obtained that is surrounded by a periphery that is obtained by extrapolation from coordinates provided by transforming grid point coordinates for an n+2-th projector in a 2n+2-th imaging image through projective transformation $H_{2n+2 \to 2n+1}$. Then, whether or not grid point coordinates $L_{n+1,2n+1}$ for an n+1-th projector in a 2n+1-th imaging image is included in such an area is determined. A method for obtaining an area surrounded by a perimeter will be described below, with reference to FIG. 16A and FIG. 16B.

Figure 12:
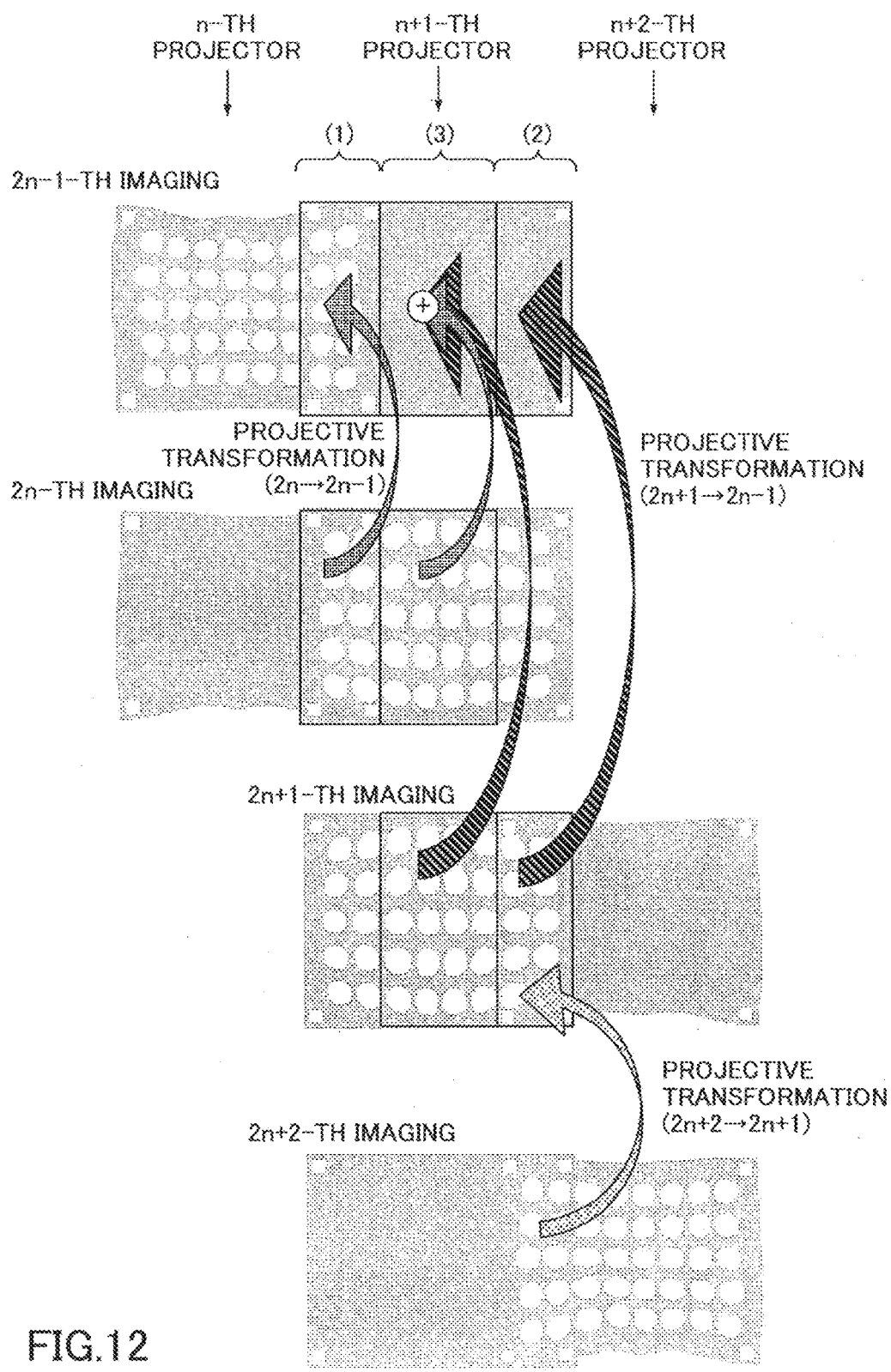
FIG. 12 is a diagram that illustrates a process for synthesizing a plurality of sets of grid points based on imaging images for calibration in different imaging ranges.

In a loop of step S207-step S212, coordinate values of a synthesized grid point are obtained for each grid point for a subject n+1-th projector, based on division at step S207. FIG. 12 is a diagram that illustrates a process for synthesizing a plurality of sets of grid points based on imaging images for calibration in different imaging ranges. At step S208, the grid point synthesis part 126 branches the process based on the division described above.

At step S208, if a determination is provided in such a manner that grid points that are objects to be processed are included in an overlap area (n,n+1) with an n-th projector, the process is, branched to step S209. At step S209, the grid point synthesis part 136 adopts grid point coordinates $L_{n+1,2n \to 2n-1}$ calculated at step S204 described above, for grid points for an n+1-th projector that overlaps with a projection range for the n-th projector described above, as grid point coordinates $L_{n+1,2n-1}$. This is because grid point coordinates $L_{n+1,2n \to 2n-1}$ based on a 2n-th imaging image having a generally identical imaging range have a less deviation from grid points for an immediate left n-th projector based on a 2n-1-th imaging image than grid point coordinates $L_{n+1,2n+1 \to 2n-1}$ based on a 2n+1-th imaging image having a different imaging range.

At step S208, if a determination is provided in such a manner that grid points that are objects to be processed (2) are included in an overlap area (n+1,n+2) with an n+2-th projector, the process is branched to step S210. At step S210, the grid point syntheses part 136 adopts grid point coordinates $L_{n+1,2n+1 \to 2n-1}$ calculated at step S205 described above, for grid points overlapping with a projection range for the n+2-th projector described above, as grid points $L_{n+1,2n-1}$. This is because grid point coordinates $L_{n+1,2n+1 \to 2n-1}$ based on a 2n+1-th imaging image having a generally identical imaging range have less deviation from grid points for a right side n+2-th projector based on a 2n+2-th imaging image than grid point coordinates $L_{n+1,2n \to 2n-1}$ based on a 2n-th imaging image having a different imaging range.

At step S208, if a determination is provided in such a manner that grid points that are objects to be processed (3) are not included in any of overlap areas (n,n+1) and (n+1, n+2) with both projection ranges for the n-th and n+2-th projectors described above, the process goes to step S211. At step S211, the grid point synthesis part 136 executes blending of grid point coordinates $L_{n+1,2n \to 2n-1}$ corresponding to a set calculated at step S204 described above and grid point coordinates $L_{n+1,2n+1 \to 2n-1}$ corresponding to a set calculated at step S205 described above to grid points that do not overlap with any of both projection ranges, so that grid points $L_{n+1,2n-1}$ for a n+1-th projector are calculated.

Figure 13:
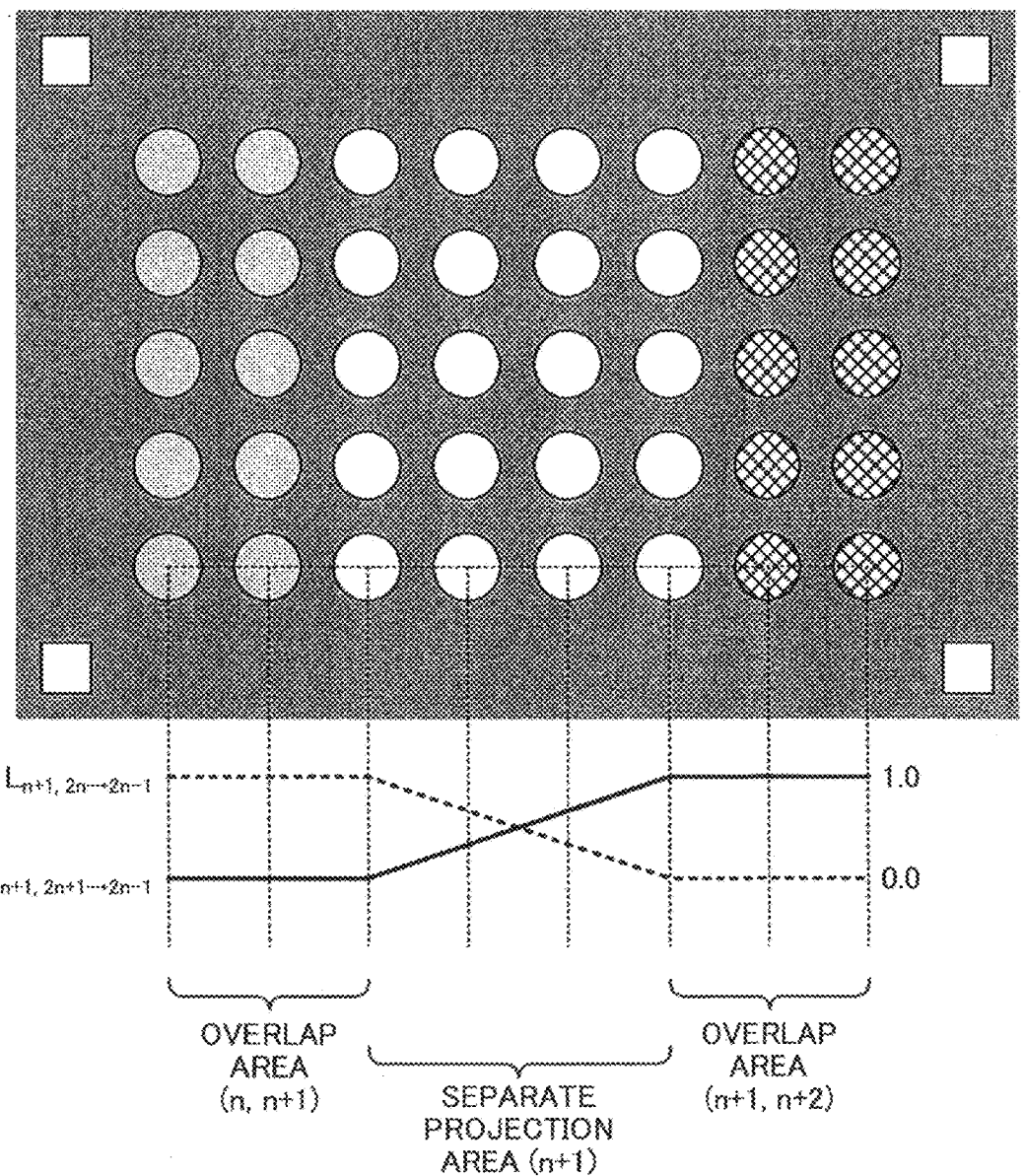
FIG. 13 is a diagram that illustrates a blending method that uses a plurality of sets of grid point coordinates based on imaging images for calibration in different imaging ranges, for grid points of a subject projector.

FIG. 13 is a diagram that illustrates a blending method that uses a plurality of sets of grid point coordinates based on imaging images for calibration in different imaging ranges, for grid points for a n+1-th projector. As illustrated in FIG. 13, for grid points included in a separate projection area for an n+1-th projector, it is possible to use a value provided by blending grid point coordinates $L_{n+1,2n \to 2n-1}$ corresponding to a set used in an overlap area (n,n+1) and grid point coordinates $L_{n+1,2n+1 \to 2n-1}$ corresponding to a set used in an overlap area (n+1,n+2). It is possible to execute blending linearly, with a weight corresponding to horizontal positions of grid points at a state of no distortion. Thus, a blending process is executed to change smoothly among grid points in the overlap area described above, so that a sudden change in distortion is suppressed. Furthermore, even if a slight amount of distortion remains, degradation of an image quality that is caused by a relative shift of images from a plurality of projectors does not occur because of a separate projection area.

Here, although linear blending dependent on horizontal positions of grid points at a state of no distortion has been described in the described embodiment, a function form for blending is not particularly limited. It is sufficient to connect grid point coordinates $l_{n+1,2n \to 2n-1}$ in a left side overlap area and grid point coordinates $L_{n+1,2n+1 \to 2n-1}$ in a right side overlap area smoothly without inconsistency.

In a loop of step S207-step S212, as the process is completed for all of grid points for an n+1-th projector, the process goes to step S213 illustrated in FIG. 9 through point A. At step S213, the grid point extraction integration part 130 determines whether a common coordinate system 2n−1 as described above is 1. At step S213, if a common coordinate system 2n−1 as described above is 1 (2n−1>1?, NO), the process goes to step S215 directly, because there have already been grid points $L_{n+1,2n-1}$ for an n+1-th projector in a coordinate system for a 1st image that is a standard.

On the other hand, if a common coordinate system 2n−1 as described above is not 1 (2n−1>1?, YES), the process is branched to step S214. At step S214, the grid point extraction integration part 130 applies one or more projective transformations to grid point coordinates $L_{n+1,2n-1}$ for an n+1-th projector to calculate grid points $L_{n+1,1}$ in a coordinate system for a 1st imaging image and the process goes to step S215. As illustrated in FIG. 10, for example, grid point coordinates $L_{3,3}$ for a 3rd projector that are synthesized in a coordinate system for a 3rd imaging image transformed into grid point coordinates $L_{3,1}$ for a 1st imaging image through projective transformation $M_{3 \to 1}$.

At step S215, the grid point extraction integration part 130 causes the process to be branched, depending on whether a variable n for specifying an object to be processed reaches N−2 that indicates a last projector with projectors at both sides thereof. At step S215, if a determination is provided in such a manner that n does not reach N−2 (n=N−2?, NO), a variable n is increased by 1 at step S216 and the process is returned to step S204 through point B. In this case, the process is repeated for a next subject projector with projectors at both sides thereof.

On the other hand, at step S215, if a determination is provided in such a manner that n reaches N−2 (n=N−2?, YES), the process is branched to step S217. At step S217 and step S218, a process is executed for obtaining grid points for a last projector. At step S217, the grid point extraction integration part 130 transforms grid point coordinates $L_{n+2,2n+2}$ for an n+2-th projector in a 2n+2-th imaging image for calibration onto a coordinate system for a 2n+1-th imaging image through projective transformation $H_{2n+2 \to 2n+1}$ so that grid point coordinates $L_{n+2,2n+1}$ are calculated. Grid points for a last or N-th projector are not synthesized because there is an overlap area at only one side (left side). At step S218, the grid point extraction integration part 130 applies one or more projective transformations to grid point coordinates $L_{n+2,2n+1}$ for an n+2-th projector to calculate grid points $L_{n+2,1}$ in a coordinate system for a 1st imaging image, and at step S219, the present process is ended. As illustrated in FIG. 10, in a case of N=4 and n=2, for example, grid point coordinates $L_{4,5}$ for a 4th projector that are transformed onto a coordinate system for a 5th imaging image are transformed into grid point coordinates $L_{4,1}$ for a 1st imaging image through projective transformation $H_{5\to3}$ and projective transformation $H_{3\to1}$.

As described above, grid point coordinates for all of projectors 150a-150d are transformed onto and integrated in a coordinate system for a 1st imaging image for calibration that is imaged by correctly facing a screen, so that grid point coordinates $L_{1,1}$-$L_{4,1}$ are calculated. Here, a described embodiment has been illustrated for executing a transformation onto a coordinate system that is common among a plurality of imaging images for calibration that are imaged in different imaging ranges and subsequently synthesizing grid points to be transformed onto a single integration coordinate system. However, an order of transformations is not particularly limited, and in another embodiment, synthesis of grid points may be executed after a transformation onto a single integration coordinate system.

Figure 14:
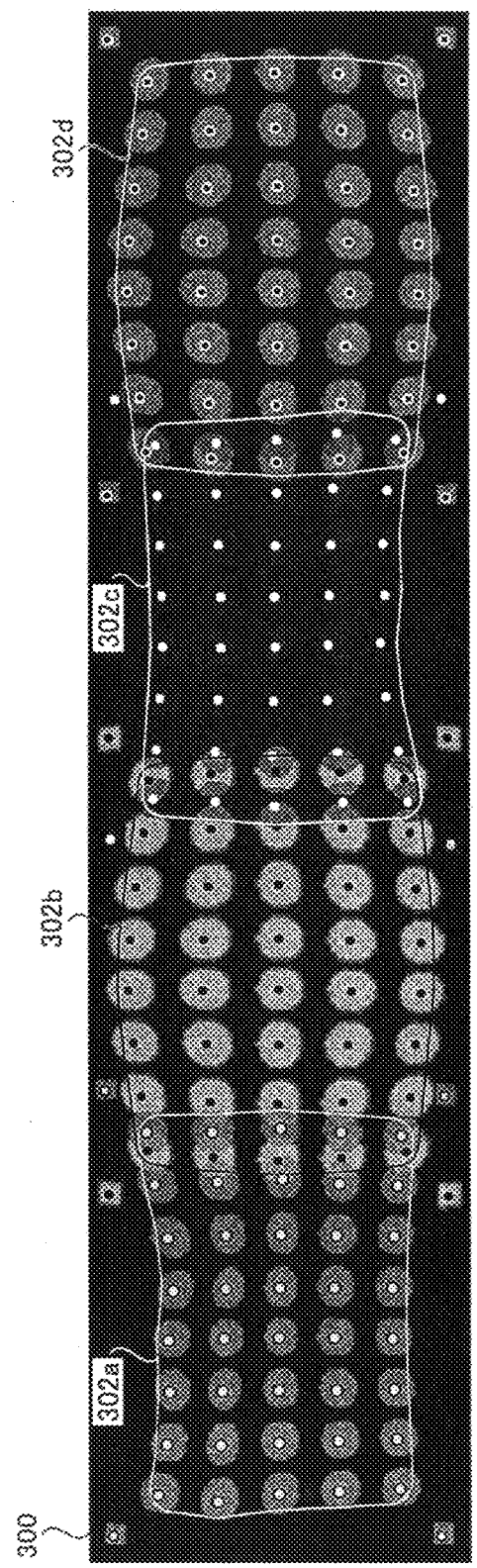
FIG. 14 is a diagram that schematically illustrates a set of grid point coordinates for each projector that are integrated on an integration coordinate system.

FIG. 14 is a diagram that schematically illustrates a set of grid point coordinates for each projector that are integrated onto an integration coordinate system 300. As illustrated in FIG. 14, each of sets 302a, 302b, 302c, and 302d of grid points for respective projectors is transformed onto and integrated in a coordinate system 300 for a 1st imaging image for calibration. Here, although imaged circular shapes for the plurality of projectors 150a-150d are drawn to be overlap in FIG. 14, images, per se, are not required to overlap.

(Calculation of a Geometrical Correction Coefficient)

A process for calculation of a geometrical correction coefficient for each projector will be described in detail below, with reference to FIG. 15 to FIG. 18 and FIG. 21A. The geometrical correction coefficient calculation part 142 calculates a geometrical correction coefficient for each projector, based on a set of separate grid points for the projectors 150a and 150d at both ends of an array and a set of synthesized grid points for the intermediate projectors 150b and 150c.

Figure 15:
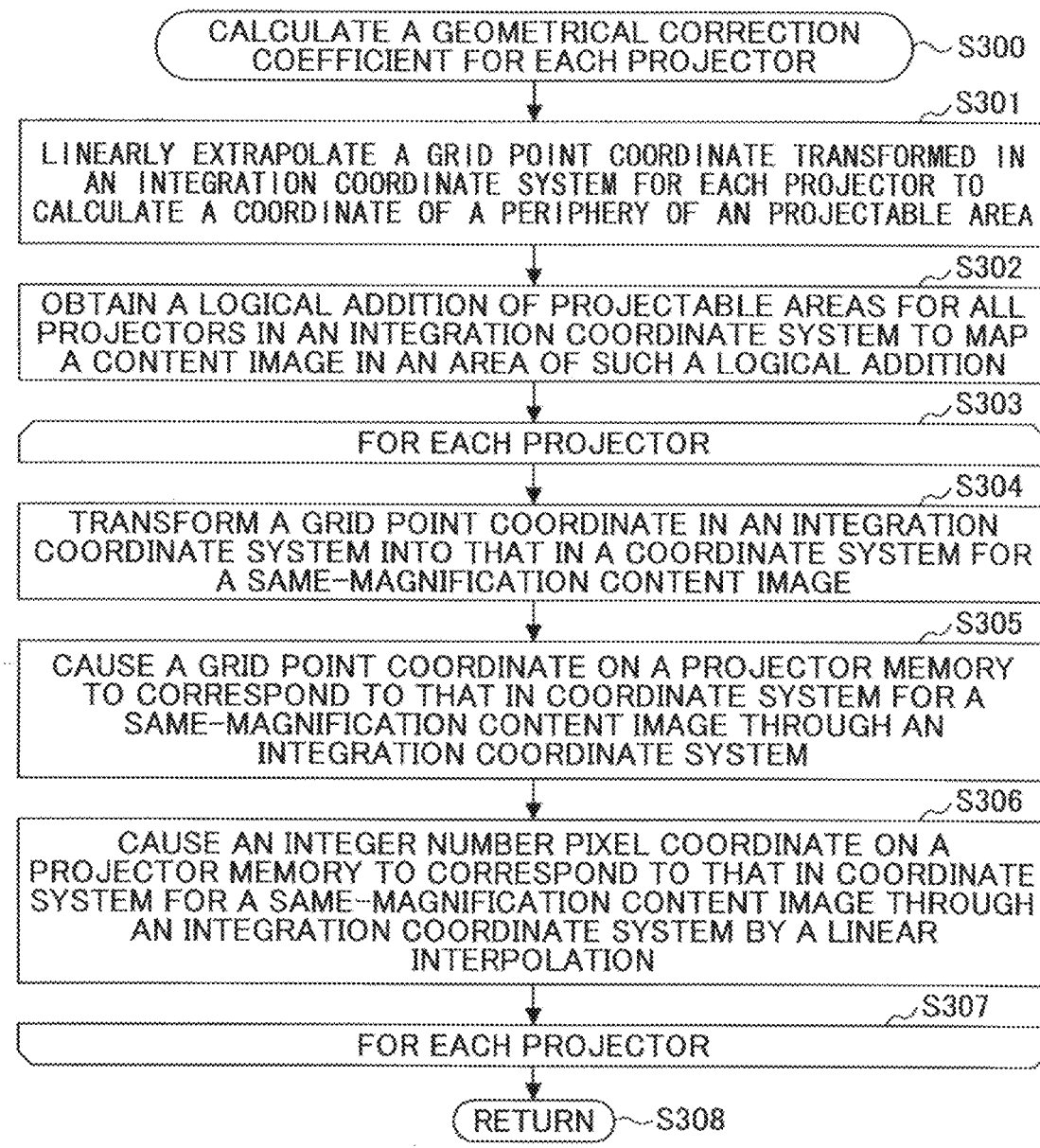
FIG. 15 is a flowchart of a process for calculation of a geometrical correction coefficient to be executed by a correction coefficient calculation part according to the present embodiment.

FIG. 15 is a flowchart that illustrates a process for calculation of a geometrical correction coefficient to be executed by the geometrical correction coefficient calculation part 142 according to the present embodiment. A process illustrates in FIG. 15 is called at step S110 illustrated in FIG. 7 and starts at step S300.

At step S301, the geometrical correction coefficient calculation part 142 linearly extrapolates each of grid point coordinates on an integration coordinate system for each of the projectors 150 and calculates coordinates of a perimeter of a projectable area (that will be referred to as a projection range, below).

Figure 16B:
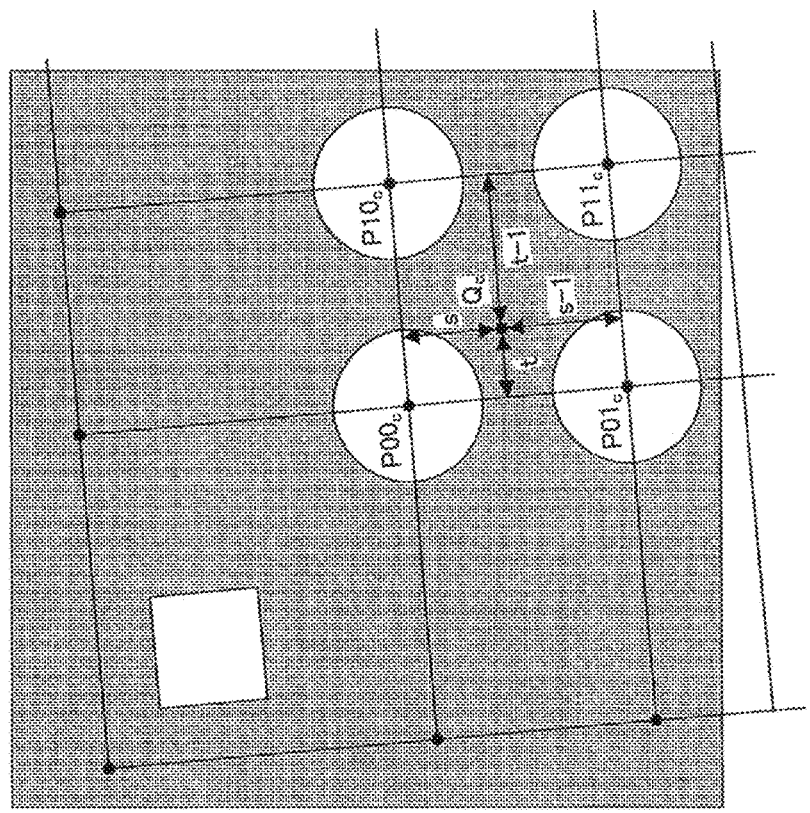
FIG. 16A and FIG. 16B are diagrams that illustrate a method for calculation of coordinates of a periphery of a projection range based on a linear extrapolation that uses integrated grid point coordinates.
Figure 16A:
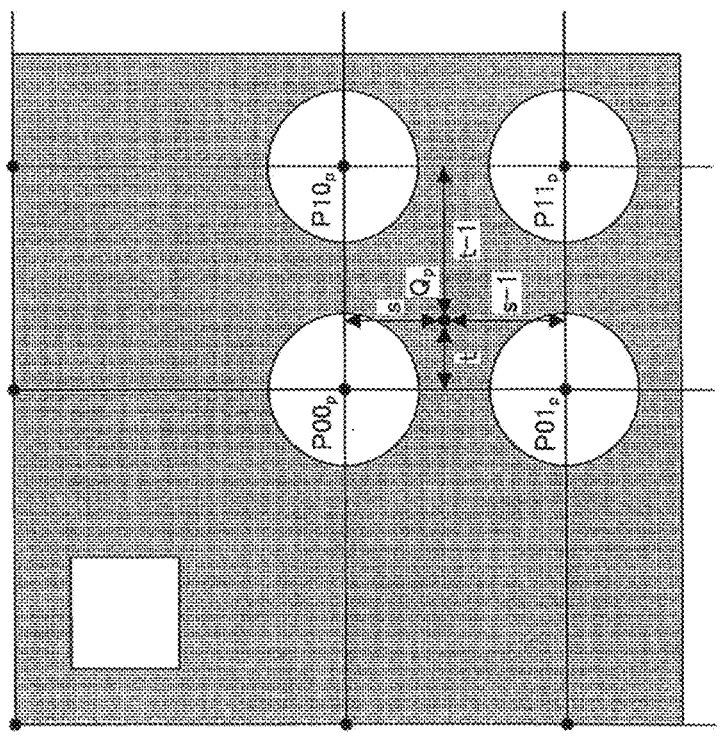

FIG. 16 is a diagram that illustrates a method for calculation of coordinates of a perimeter of a projection range based on a linear extrapolation using each of integrated grid point coordinates. FIG. 16A illustrates four grid points at an upper left corner on a projector memory and FIG. 16B illustrates four corresponding grid points in an integration coordinate system. As illustrated in FIG. 16A, coordinates of a perimeter (four corners and grid points on four sides) on a projector memory are determined at positions of extrapolation of a quadrilateral patch (for example, positions at a distance of, for example, 1.5 times a distance between grid points) for four grid points (for example, $P00_P$-$P11_P$) positioned at a peripheral portion.

As illustrated in FIG. 16B, it is possible to calculate coordinates of peripheral pixels (four corners and grid points on four sides) that correspond to a projection range for each projector in an integration coordinate system by linearly extrapolating each of coordinates of four grid points positioned on a peripheral portion. Similarly, it is also possible to obtain points in an integration coordinate system that correspond to points at arbitrary coordinates other than peripheral coordinates on a projector memory, by linearly interpolating or extrapolating grid point coordinates of neighboring four points.

Herein, an arbitrary coordinate point $Q_P$ on a projector memory is a point for internal dividing at t:1−t (0<t<1) in a direction of an x-axis and at s:1−s (0<s<1) in a direction of a y-axis with respect to four grid points $P00_P$, $P10_P$, $P01_P$, and $P11_P$ with neighboring coordinate positions on a projector memory. Accordingly, it is possible to calculate a point $Q_C$ in an integration coordinate system that corresponds to a coordinate pint $Q_P$, by using the following formula (3):

$$Q_c=(1-s)((1-t)P00_C+tP10_C)+s((1-t)P01_C+tP11_C) \quad (3)$$

based on coordinate vectors that correspond to four grid points $P00_P$, $P10_P$, $P01_P$, and $P11_P$. In a case of a point for extrapolation, it is possible to be calculated by using the formula (3) described above while ranges of −1.5<t<0 and −1.5<s<0 are set for t and s described above.

A non-linear geometrical distortion may be produced over an entire image, because a size of a quadrilateral patch composed of 2×2 grid points that are a part thereof is sufficient small herein and it is possible to be regarded as a linear geometrical distortion in such a range and a range where a predetermined extent of extrapolation for a perimeter is executed. Here, in another embodiment, a point $Q_P$ on a projector memory may be caused to correspond to a corresponding point $Q_C$ in an integration coordinate system through a projective transformation that is obtained by using a pair of four adjacent grid points.

As a linear extrapolation described above is executed for each projector, projection ranges for four projector 150a-150d (that is a range on which a white solid image is projected) are detected in an integration coordinate system. FIG. 17A illustrates projection ranges 304a-304d for four projectors that are detected in an integration coordinate system 300. The projection range 304a for a first projector 150a is indicated by a white solid line and the projection range 304b for the second projector 150b is indicated by a white broken line. The projection range 304c for the third projector 150c is indicated by a white dashed-two-dotted line and the projection range 304d for the fourth projector 150d is indicated by a white dashed-one-dotted line.

As FIG. 15 is referred to again, at step S302, the geometrical correction coefficient calculation part 142 obtains a logical addition (OR) of projection ranges for all the projectors in an integration coordinate system and sets a post-correction projection target area for mapping a content image in an area of the logical addition described above. A post-correction projection target area is set in such a manner that a content image is mapped with a maximum size in an area that is a logical addition of the projection ranges 304a-304d for all the projectors while its aspect ratio is held.

While points at four corners of each projection range in an integration coordinate system are known, each of four sides (a top side, a bottom side, a left side, and a right side) for connecting these points is also obtained so as to be linearly divided by a grid point width, and a range of existence thereof is also held. Therefore, a rectangular range that is capable of being taken in an area of a logical addition of the four projection ranges is determined in a range interposed between a top side 306T and a bottom side 306B of projection ranges 304a-304d for four projectors in an integration coordinate system and a range interposed between a left side 306L and a right side 306R similarly.

A post-correction projection target area 310 is an area assigned with a maximum size in a rectangular range with four sides 306T, 306B, 306L, and 306R while an aspect ratio (for example, M:N) of a content image is held, like a rectangular area as indicated by a dotted line in FIG. 17A. In the illustration of FIG. 17A, a slight amount of margin is present in a longitudinal direction, so that blank spaces are provided at the top and the bottom and a post-correction projection target area is centered. Then, as illustrated in FIG. 17B, a content image 320 to be projected is pasted on this post-correction projection target area 310.

As FIG. 15 is referred to again, each process indicated at step S304-step S306 is executed for each projector in a loop of step S303-step S307 and a geometrical correction coefficient is obtained for each of a plurality of projectors. At step S304, the geometrical correction coefficient calculation part 142 transforms coordinates of a grid point in an integration coordinate system into those in a coordinate system for an original content image. In the following, a content image that is pasted on the post-correction projection target area 310 in an integration coordinate system will be referred to as a "projection content image" and an original content image thereof will be referred to as a "same-magnification content image".

At step S305, the geometrical correction coefficient calculation part 142 causes grid point coordinates on a projector memory to correspond to a position of a pixel in a coordinate system for a same-magnification content image through an integration coordinate system. At step S306, the geometrical correction coefficient calculation part 142 causes coordinates of an integer number of pixels on a projector memory to correspond to positions of pixels in a coordinate system for a same-magnification content image through a common coordinate system by a linear interpolation.

Figure 18:
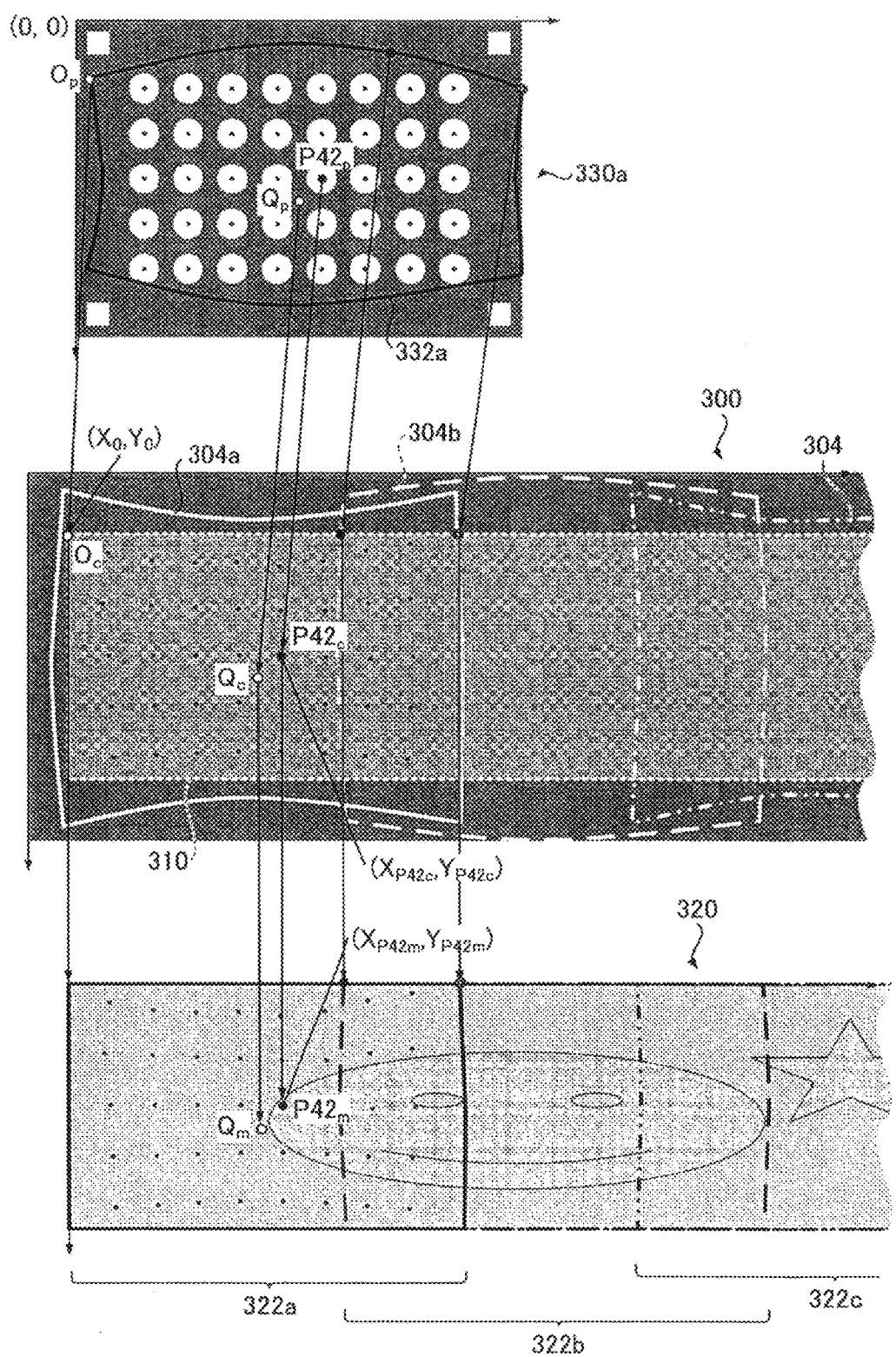
FIG. 18 is a diagram that illustrates a correspondence between respective coordinates on a projector memory and coordinates on a same-magnification content image that correspond to a position on a projection content image.

As illustrated in FIG. 18, a geometrical correction coefficient calculated in each of processes indicated by step S303-step S307 is to cause each coordinate on a projector memory 330 to correspond to a position of a pixel on a same-magnification content image that corresponds to a position on a projection content image.

As one grid point $P42_P$ on a projector memory $330a$ as illustrated in FIG. 18 is described representatively, a corresponding point $P42_C$ ($X_{P42C}$, $Y_{P42C}$) in the integration coordinate system 300 is extracted for the grid point $P42_P$ on the projector memory 330. Then, a content image is mapped on the post-correction projection target area 310, and hence, a corresponding pixel position $P42_m$ ($X_{P42m}$, $Y_{P42m}$) on a same-magnification content image is further determined for a coordinate position $P42_C$ in the integration coordinate system 300 as illustrated in FIG. 18.

It is possible to calculate a corresponding pixel position $P42_m$ ($X_{P42m}$, $Y_{P42m}$) on a same-magnification content image from coordinates ($X_{P42C}$, $Y_{P42C}$) of a corresponding point $P42_C$ in the integration coordinate system 300 by the following formula (4):

$$X_{P42m} = (X_{P42C} - X_0)/R$$

$$Y_{P42m} = (Y_{P42C} - Y_0)/R \qquad (4)$$

In the following formula (4), coordinates ($X_0$, $Y_0$) are coordinates of an upper left origin on a projection content image in an integration coordinate system and R represents a magnification of a content image. Here, although a same-magnification content image is directly mapped on the post-correction projection target area 310 with a predetermined magnification R for convenience of an explanation herein, a method for mapping a content in an integration coordinate system is not particularly limited.

Similarly, positions of corresponding pixels on a same-magnification content image are also calculated for all of grid points $Pij_P$ other than the grid point $P42_P$ on a projector memory. For arbitrary coordinates other than those of grid points on a projector memory, pixel positions on a content image that correspond to 2×2 neighboring grid points are linearly interpolated (or interpolated or extrapolated on a peripheral portion) in accordance with a similar method described with reference to FIG. 16A and FIG. 16B, so that it is possible to calculate a position of a corresponding pixel on a same-magnification content image. Thereby, a pixel in a predetermined area $332a$ on a projector memory $330a$ is caused to correspond to a position of a pixel in an area $322a$ covered by the first projector $150a$ on the content image 320.

FIG. 21A illustrates a data structure of geometrical correction coefficients for one projector that is calculated in processes at step S303-step S307. As illustrated in FIG. 21A, thus obtained corresponding pixel positions on a same-magnification content image for all pixels on a projector memory are geometrical correction coefficients.

As a loop of step S303-step S307 is repeated by the number of projectors and a correspondence between coordinates of an integer number of pixels on a projector memory and a coordinate system for a same-magnification content image is completed for all of projectors, it goes to step S308. At step S308, the present process is ended and the process is returned to an invoker illustrated in FIG. 7. Thereby, respective geometrical correction coefficients are prepared for all the projectors $150a$-$150d$.

(Calculation of a Blending Coefficient)

Figure 19:
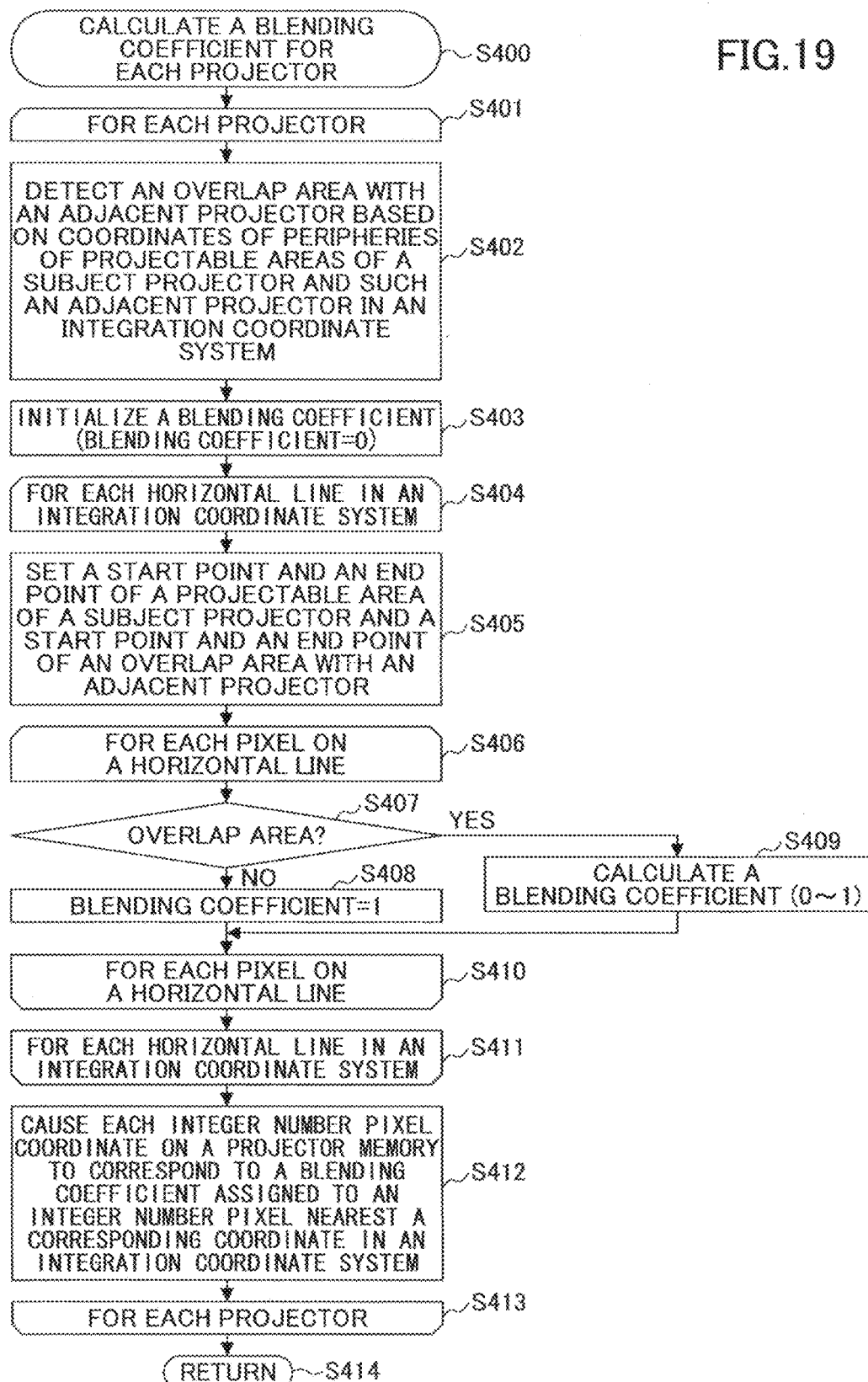
FIG. 19 is a flowchart of a process for calculation of a blending coefficient to be executed by a correction coefficient calculation part according to the present embodiment.

A process for calculation of a blending coefficient for each projector will be described in detail below, with reference to FIG. 19, FIG. 20, and FIG. 21B. FIG. 19 is a flowchart that illustrates a process for calculation of a blending coefficient that is executed by the blending coefficient calculation part 144 according to the present embodiment. A process illustrated in FIG. 19 is called at step S111 illustrated in FIG. 7 and starts at step S400. In a loop of step S401-step S413, respective processes indicated by step S402-step S412 are executed for each subject projector and a blending coefficient for each of the plurality of projectors $150a$-$150d$ is obtained.

At step S402, the blending coefficient calculation part 144 detects, based on coordinates of peripheries of projection ranges for a subject projector and projectors adjacent to the subject projector in the integration coordinate system 300, overlap areas thereof. FIG. 20 is a diagram that illustrates a correspondence of a blending coefficient to each coordinate on the projector memory 330. As illustrated in FIG. 20, exploration is executed from a lift origin (a white circle) toward a right direction on a top side of the post-correction projection target area 310 in the integration coordinate system 300, so that a start point (a black circle) and an end point (a double circle) of an overlap area between the first projector $150a$ and the second projector $150b$ are detected. Similarly, a start point and an end point of an overlap area are also detected for another horizontal line.

As FIG. 19 is referred to again, at step S402, the blending coefficient calculation part 144-first initializes a blending coefficient for each coordinate in a common coordinate system at 0. In a loop of step S404-step S411, respective processes indicated by step S405-step S410 are executed for each horizontal line in an integration coordinate system (wherein only a portion corresponding to a post-correction projection target area is sufficient). An intermediate result of a blending coefficient is assigned to coordinates of each position in an integration coordinate system by respective processes indicated by step S405-step S410.

At step S405, a start point and an end point of a projection range for a subject projector and a start point and an end point of an overlap area with adjacent projector, on a subject horizontal line, are set based on coordinates of a periphery of a projection range described above and a detected overlap area.

In a loop of step S406-step S410, processes indicated by step S407-step S409 are executed for each pixel (within only a projection range) on a horizontal line in an integration coordinate system. A blending coefficient for each pixel on a horizontal line in an integration coordinate system is determined by processes indicated by step S407-step S409.

At step S407, the blending coefficient calculation part 144 branches a process depending on whether a subject pixel corresponds to that in an overlap area. At step S407, if a determination is provided so as not to correspond to that in an overlap area (NO), the process goes to step S408. In this case, the blending coefficient calculation part 144 determines a blending coefficient at a maximum value of 1 at step S408, because a pixel corresponds to that in a not-overlapping or separate projection range. On the other hand, at step S407, if a determination is provided so as to correspond to that in an overlap area (YES), the process goes to step S409. In this case, the blending coefficient calculation part 144 calculates a blending coefficient in accordance with a predetermined relation or formula at step S409, because a pixel corresponds to that in an area that overlaps an adjacent projector. After a correction is provided in such a manner that an inverse correction to an input-output characteristic of a projector is once applied to be linear, weighting is executed in such a manner that an amount of light from projectors at both sides is totally 1.

Figure 20:
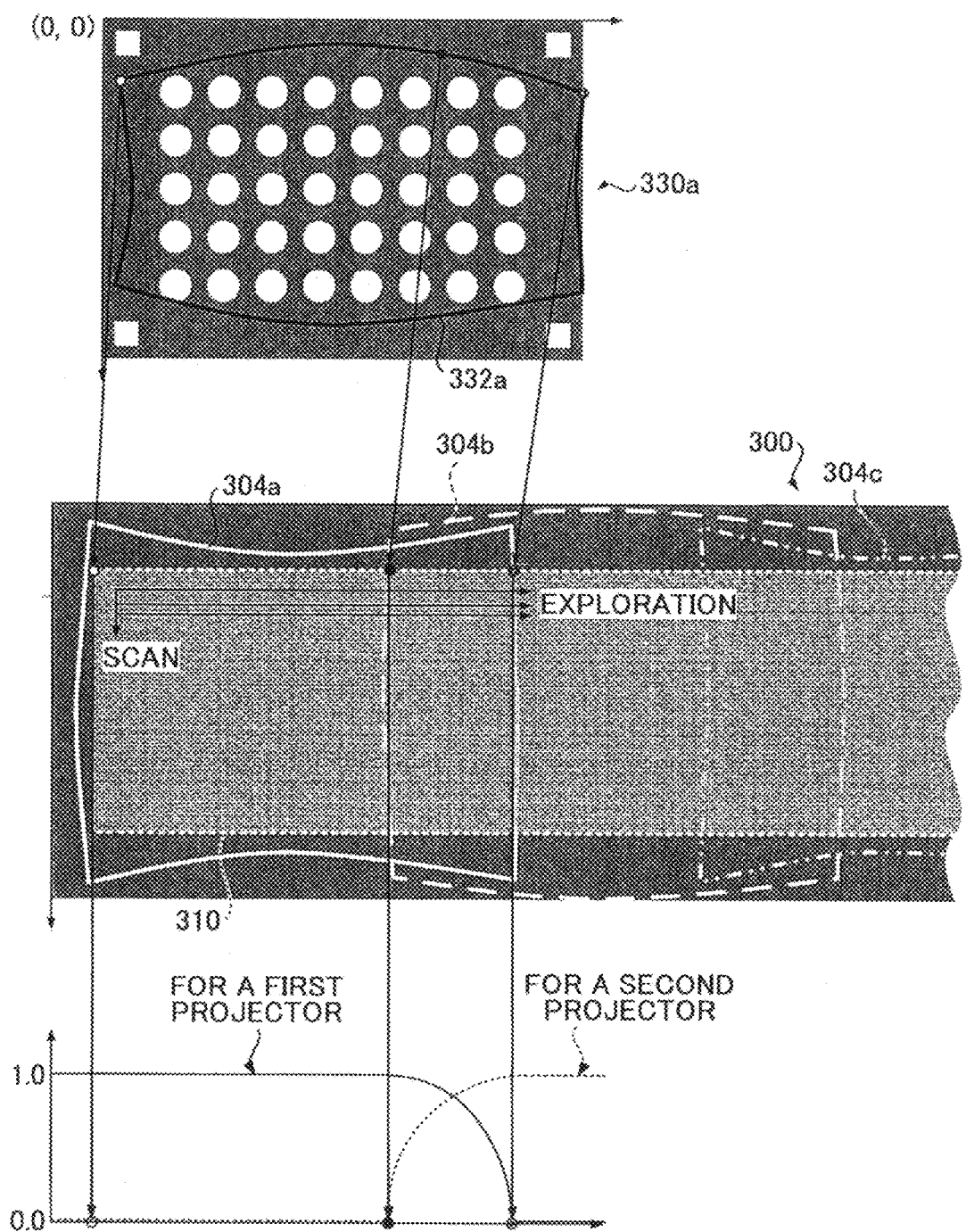
FIG. 20 is a diagram that illustrates correspondence between respective coordinates on a projector memory and a blending coefficient.

Specifically, a blending coefficient is determined at a maximum of 1 a step S408 described above, for pixels in a range from an origin (a white circle) to a start point (a black circle) in an overlap area, as illustrated with respect to a first projector in a lower graph of FIG. 20. On the other hand, a blending coefficient with an inverse correction to an input-output characteristic of a projector being applied thereto is calculated at step S409 described above, for pixels from a start point (a black circle) to an end point (a double circle) in an overlap area, in such a manner that a practical brightness is gradually and linearly reduced from 1.0 to 0 depending on a horizontal distance from a start point (a black circle).

In a loop of step S404-step S411, an intermediate result of a blending coefficient is determined for each of an integer number of pixels in an integration coordinate system. For an area other than a projection range, zero is set by an initialization at step S403. As a process for all of horizontal lines in an integration coordinate system has been completed, the process goes to step S412. For a horizontal line other than that in a post-correction projection target area, zero is set for each pixel by an initialization at step S403.

At step S412, the blending coefficient calculation part 144 causes each of coordinates of an integer number of pixels on a projector memory to correspond to a blending coefficient that is assigned to an integer number of pixels closest to coordinates (decimals) in an integration coordinate system that correspond to a data structure illustrated in FIG. 21A. FIG. 21B illustrates a data structure of blending coefficients for one projector that is calculated in a process at step S402-step S412. As illustrated in FIG. 21B, blending coefficients are obtained for all of pixels on a projector memory.

In a loop of step S401-step S413, as a process for all of projectors is completed, the present process ends at step S414 and the process is returned to an invoker illustrated in FIG. 8. By the process described above, blending coefficients for all of pixels on a projector memory are obtained for each of the plurality of projectors 150a-150d.

(Correction Process)

A correction process based on the correction coefficients described above will be described in detail below, with reference to FIG. 21A, FIG. 21B, and FIG. 22. FIG. 22 is a diagram that illustrates a correction process based on the correction coefficients described above. Each geometrical correction coefficient calculated by the geometrical correction coefficient calculation part 142 described above and each blending coefficient for a projector calculated by the blending coefficient calculation part 144 described above are set in each correction processing part 114 at step S112 illustrated in FIG. 7.

The correction processing part 114 reads out correspondence data illustrated in FIG. 17A in a process at the geometrical correction coefficient calculation part 142 described above. The correction processing part 114 produces an intermediate image from a same-magnification content image to be projected, based on a position (decimal) of a pixel on a same-magnification content image to be referred to for each pixel on a projector memory, in accordance with a bilinear or bicubic pixel interpolation method or the like. The correction processing part 114 further multiplies a value of a pixel for each of colors R, G, and B in a produced intermediate image by a corresponding blending coefficient with respect to correspondence data in FIG. 17B to produce a final projection image.

FIG. 22 illustrates projection images 350a-350d that are finally obtained from a content image by correction processing parts 114a-114d for four projectors 150a-150d. As illustrated in FIG. 22, these projection images 350a-350d are projected from the respective four projectors 150a-150d during a projection mode. A projection image 350 is provided by applying each kind of correction to a portion of a content image that is handled by a corresponding projector 150. Accordingly, projected images of the projection images 350a-350d overlap a projection surface preferably to be synthesized into a single projection image 352.

(Variation Example of a Scene-for-Calibration Selection Part)

A variation example of an embodiment will be described below, with reference to FIG. 23A and FIG. 23B to FIG. 25A and FIG. 25B. In the above descriptions, a case has been described where multi-projection is executed by aligning projection images in a horizontal direction (wherein a vertical direction is also similar). FIG. 23A and FIG. 23B to FIG. 25A and FIG. 25B illustrate a generalized multi-projection wherein projection images are arranged in a two-dimensional grid shape. Here, in the variations described with reference to FIG. 23A and FIG. 23B to FIG. 25A and FIG. 25B, a case where imaging for calibration is executed by using six projectors in transversely 3 columns and longitudinally 2 rows as illustrated in FIG. 23A and providing each combination of transversely two columns and longitudinally two rows inside imaging ranges 410 and 420 with a shift in a horizontal direction is illustrated as one example.

In this variation example of an embodiment, a scene-for-calibration selection part 120 also reads out each image for calibration from the image-for-calibration-storage-part 118 and selects and outputs a proper image for calibration to each of the plurality of projectors 150. In this variation example of an embodiment, two kinds of images for calibration are a first image for calibration Ci that includes only a grid pattern illustrated in FIG. 23B and a second image for calibration Ai that includes only a position adjustment pattern. A third image for calibration is also used and provided as an image for calibration Ci+Ai that is obtained by synthesizing first and second images for calibration C1 and Ai.

The scene-for-calibration selection part 120 holds a positional relationship among projection images for a plurality of projectors i (i=1, . . . , N: N=6 is provided in a described example) and prepares a plurality of projection scenes for calibration in such a manner that the following conditions (A)-(E) are fulfilled in order to obtain a result of calibration for each projector without an excess or deficiency as a whole.

A first condition (A) is a condition that adjacent projectors 150 do not simultaneously project a grid pattern in an array of projection images in an identical scene. That is, in a case where a grid pattern Ci is projected from a projector i in a scene, grid patterns for eight projectors adjacent to such a projector i are not projected. As a plurality of projection scenes for calibration are prepared so as to fulfill the first condition (A), an overlap is prevented among grid patterns for adjacent projectors.

A second condition (B) is a condition that at least one of grid patterns Ci (i=1, . . . , N: N=6 is provided in a described example) for all of projectors that contribute to multi-projection is included in a plurality of projection scenes for calibration as a whole. As a plurality of projection scenes for calibration are prepared so as to fulfill the second condition (B), it is ensured that a distortion correction is applied to projection images for all of projectors i.

A third condition (C) is a condition that one projection scene for calibration includes a position adjustment pattern Ai that is projected from a projector i that is common to at least one of other projection scenes for calibration. A fourth condition (D) is a condition that, in a case where scenes in a plurality of projection scenes for calibration are connected as a whole based on a position adjustment pattern Ai that is common among the scenes on an assumption of the third condition (C), a projection scene for calibration is a node and the connection is a link so that a tree structure is formed.

A projection scene for calibration being a node and the connection is a link so that a tree structure is formed means that it is possible to be integrated in a coordinate system for an imaging image for calibration wherein one scene that is a root is imaged. Therefore, as a plurality of projection scenes for calibration are prepared so as to fulfill the third condition (C) and the fourth condition (D), it is ensured that it is possible to integrate, in a single integration coordinate system, coordinates of imaging images for calibration that are imaged in all of scenes.

A fifth condition (E) is a condition that a plurality of projection scenes for calibration include a plurality of scenes wherein a subject projector is a projector with projectors for executing divisional imaging in different imaging ranges being present at both ends of an array of projection images and the subject projector projects a grid pattern for each of more than once imaging in the different imaging ranges that commonly include a projection range of the subject projector. As the fifth condition (E) is fulfilled, it is ensured that, for a projector with projectors for executing divisional imaging in different imaging ranges being present at both ends of an array of projection images, a plurality of sets of grid points are prepared that are provided with a small shift with respect to grid points for each of projectors at both ends.

Figure 23B:
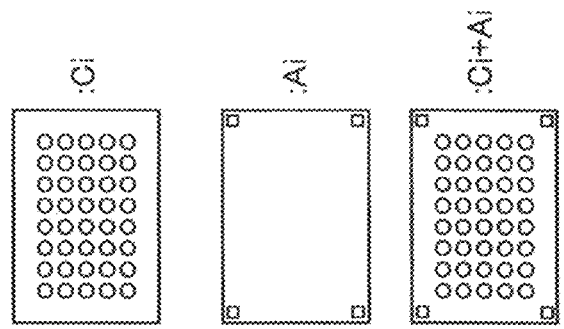
FIG. 23A and FIG. 23B are diagrams that respectively illustrate a case where multi-projection is executed by using six projectors with transversely three columns×longitudinally two rows as a variation example of the embodiment (FIG. 23A), and an image for calibration to be used in the variation example of the embodiment (FIG. 23B).
Figure 23A:
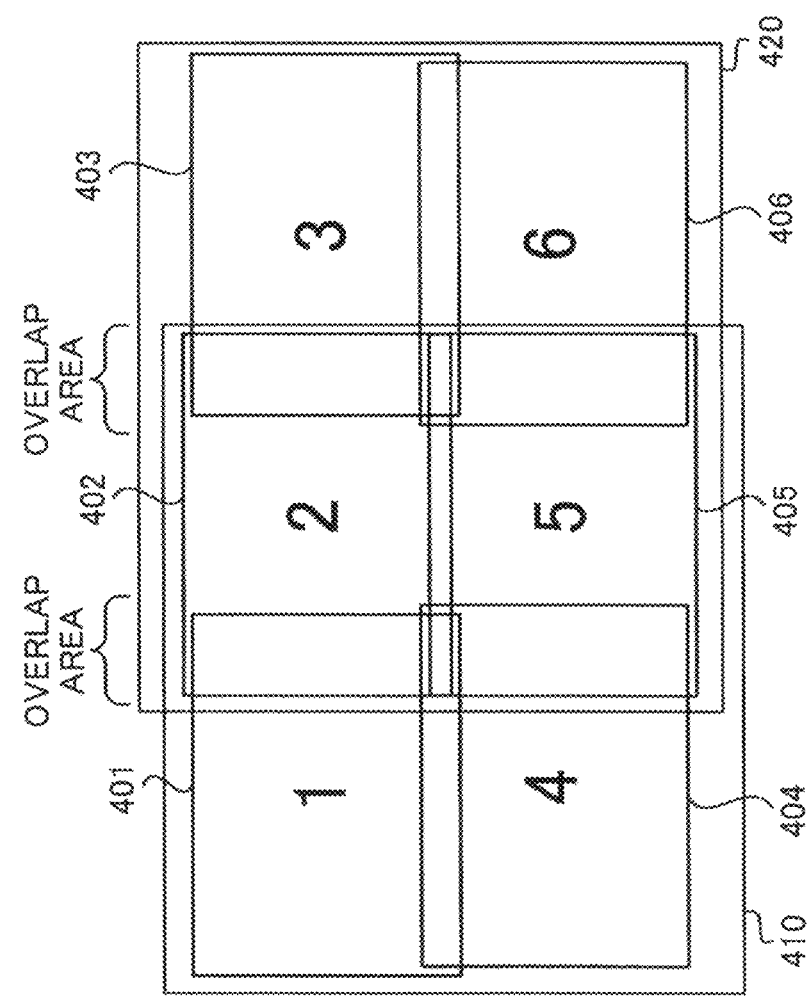
Figure 24A:
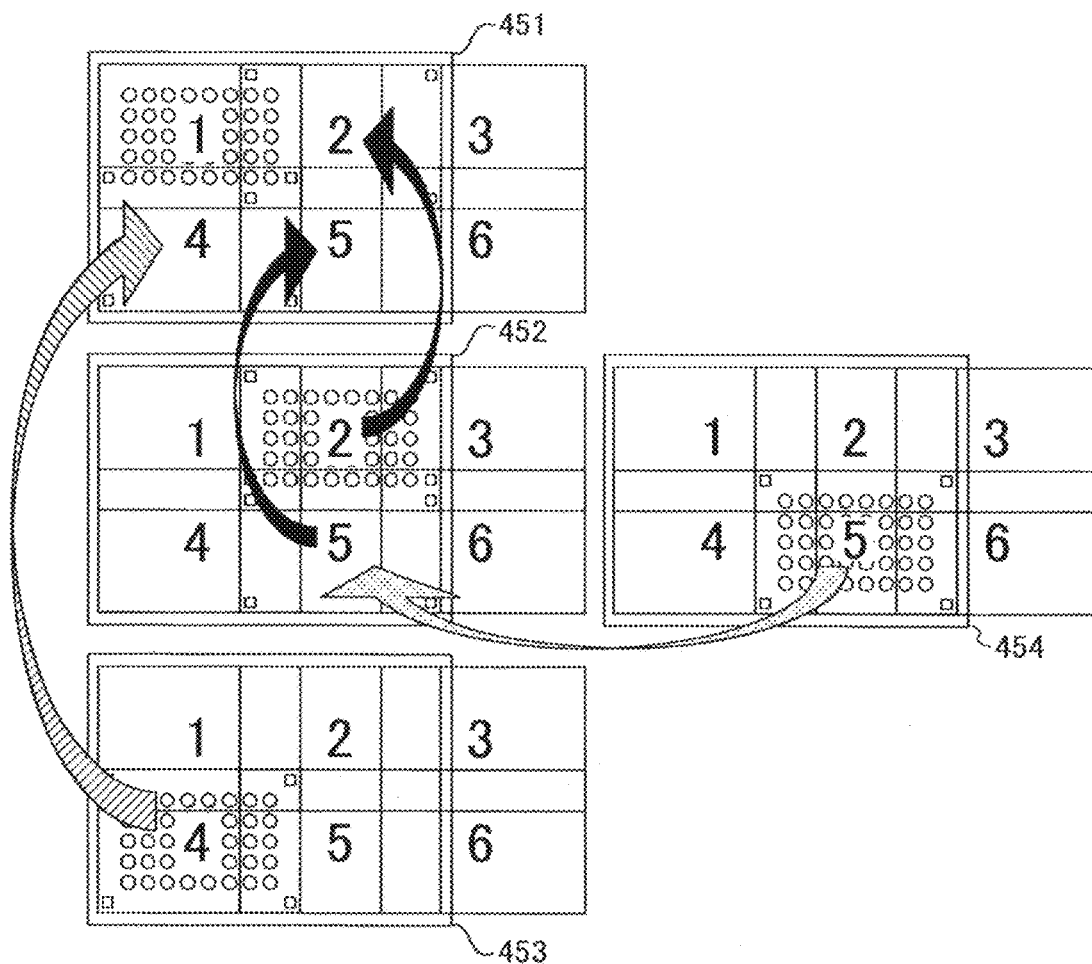
FIG. 24A and FIG. 24B are diagrams that respectively illustrate a projection scene for calibration to be configured in a variation example of the embodiment, an imaging method thereof and an integration method thereof (FIG. 24A), and a tree structure to be configured in a projection scene for calibration (FIG. 24B) (1/2).
Figure 24B:
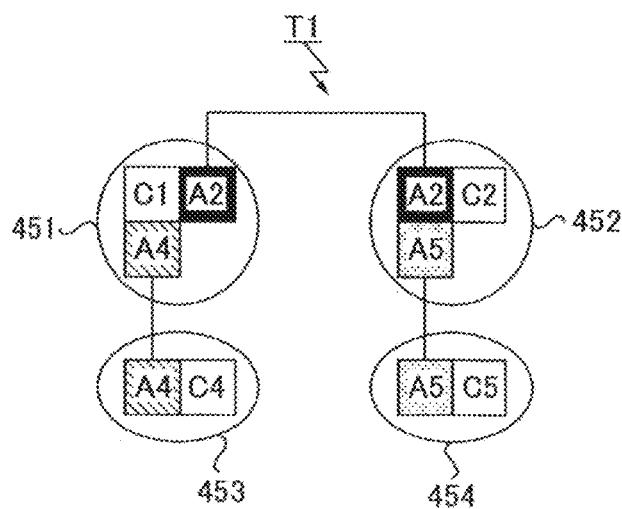
Figure 25A:
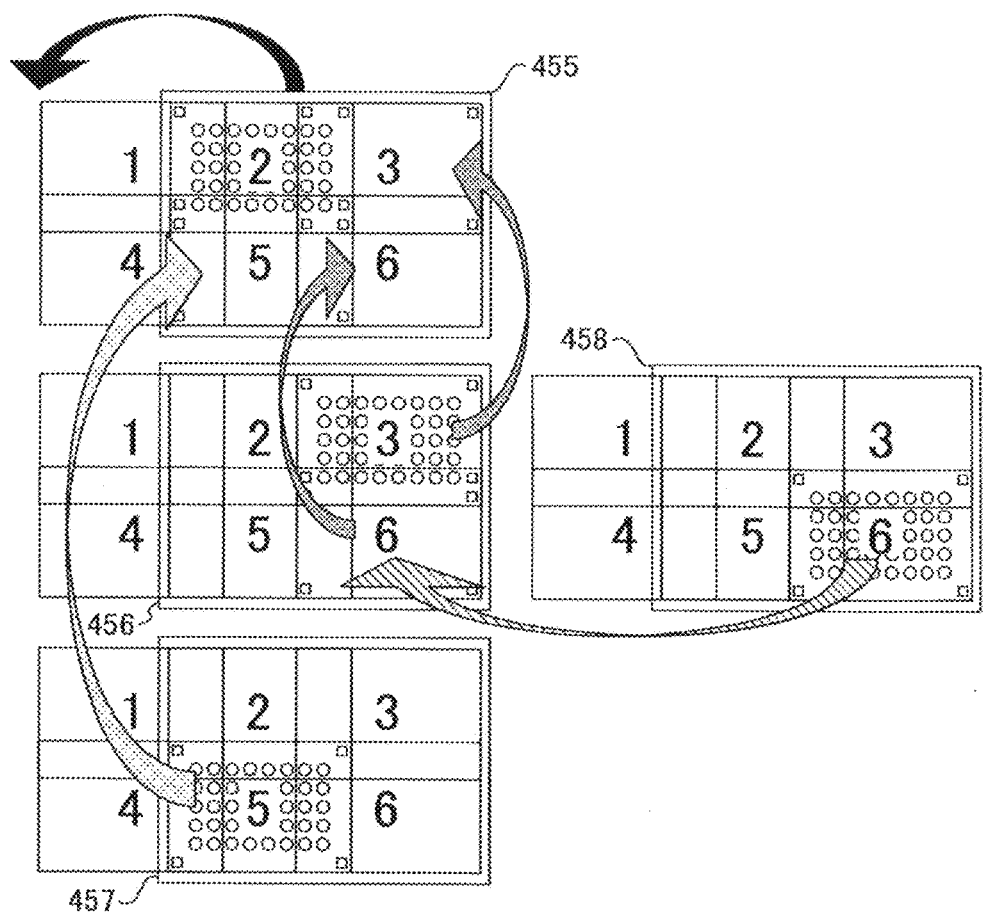
FIG. 25A and FIG. 25B are diagrams that respectively illustrate a projection scene for calibration to be configured in a variation example of the embodiment, an imaging method thereof and an integration method thereof (FIG. 25A), and a tree structure to be configured in a projection scene for calibration (FIG. 25B) (2/2).
Figure 25B:
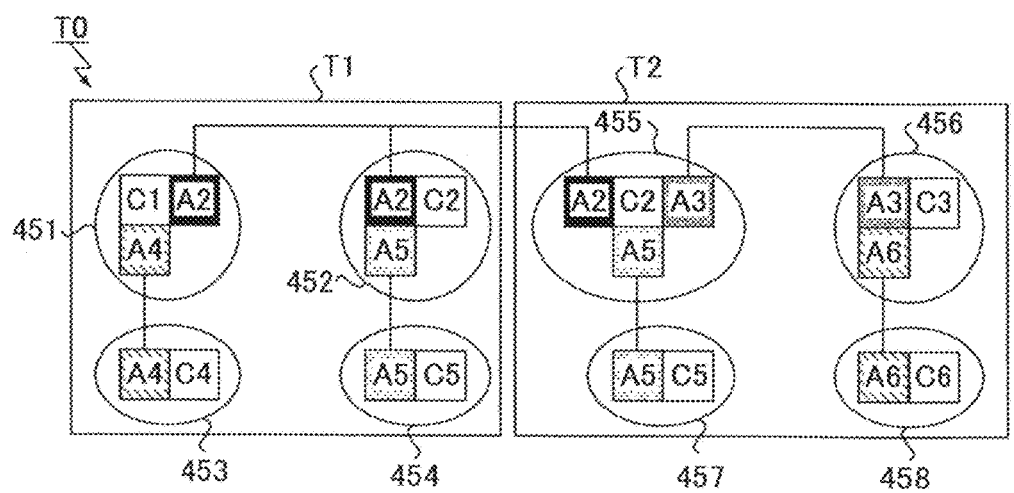

FIG. 24A, FIG. 24B, FIG. 25A, and FIG. 25B are diagrams that illustrate a projection scene for calibration configured to fulfill the conditions (A)-(E) described above, an imaging method thereof, and an integration method thereof. FIG. 24A and FIG. 25A correspond to four projection scenes for calibration for respective different imaging ranges 410 and 420 illustrated in FIG. 23. FIG. 24B and FIG. 25B are diagrams that illustrate tree structures composed of projection scenes for calibration illustrated in FIG. 24A and FIG. 25A.

In FIG. 24A and FIG. 24B, four projection scenes for calibration are prepared that correspond to imaging four times in the imaging range 410 illustrated in FIG. 23A and FIG. 23B. For these four projection scenes for calibration, respective imaging images 451-454 are linked by a position adjustment pattern A2 for a second projector, a position adjustment pattern A4 for a fourth projector, and a position adjustment pattern A5 for a fifth projector, so that one tree structure T1 is formed.

In FIG. 25A and FIG. 25B, four projection scenes for calibration are prepared that correspond to imaging four times in the imaging range 420 illustrated in FIG. 23A and FIG. 23B. For these four projection scenes for calibration, respective imaging images 455-458 are linked by a position adjustment pattern A3 for a third projector, a position adjustment pattern A5 for a fifth projector, and a position adjustment pattern A6 for a sixth projector, so that a partial tree structure T2 is formed.

Scenes illustrated in FIG. 24A and FIG. 24B and Scenes illustrated in FIG. 25A and FIG. 25B include a scene in which a position adjustment pattern A2 for a second projector is commonly projected. Accordingly, a tree structure T1 corresponding to scenes illustrated in FIG. 24A and FIG. 24B and a tree structure T2 corresponding to scenes illustrated in FIG. 25A and FIG. 25B are further connected through a link A2 so that a tree structure T0 is formed as a whole. Here, although there is a scene in which a position adjustment pattern A5 for a fifth projector is also commonly projected, in the examples illustrated in FIG. 23A and FIG. 23B to FIG. 25A and FIG. 25B, it is sufficient to provide, herein, a link based on one of a position adjustment pattern A2 and a position adjustment pattern A5.

In the variation examples illustrated in FIG. 23A and FIG. 23B to FIG. 25A and FIG. 25B, grid patterns are not simultaneously projected from adjacent projectors for each projection scene for calibration, so that the first condition (A) described above is fulfilled. Furthermore, a plurality of projection scenes for calibration include at least each one of grid patterns Ci (i=1-6) as a whole, so that the second condition (B) described above is fulfilled. Moreover, eight projection scenes for calibration (that correspond to imaging images 451-458) compose a tree structure T0 due to a position adjustment pattern that is common among scenes indicated by A2, A4, A5, A3, and A6, so that the third condition (C) and the fourth condition (D) are fulfilled.

Moreover, in the present variation example, projectors for divisional imaging with different imaging ranges at both ends in an array of projection images are present as illustrated in FIG. 23A, and a second projector that has an overlap area with these imaging ranges projects a grid pattern in a plurality of scenes (that correspond to imaging images for calibration 452 and 455). For a fifth projector, a plurality of scenes on each of which a fifth projector projects a grid pattern (that correspond to imaging images for calibration 454 and 457) are also included similarly. Hence, the fifth condition (E) described above is fulfilled.

Furthermore, in the variation examples illustrated in FIG. 23A and FIG. 23B to FIG. 25A and FIG. 25B, a plurality of scenes that correspond to more than one imaging with a generally identical imaging range (for example, scenes illustrated in FIG. 24A or FIG. 25B) are configured to compose an at least partial tree structure (for example, T1 or T2). Projection scenes for calibration are thus configured, so that it is possible to improve compatibility of grid points among projectors for divisional imaging with a generally identical imaging range.

Furthermore, in the variation examples illustrated in FIG. 23A and FIG. 23B to FIG. 25A and FIG. 25B, all of projectors with projection ranges that are included in a generally identical imaging range are configured to project each one of grid patterns for a plurality of scenes that correspond to more than a first imaging with a generally identical imaging range as a whole. Projection scenes for calibration are thus configured so that it is possible to reduce the number of projectors that should be provided inside an angle of view with respect to the number of times of imaging and an efficient calibration process is possible.

(Hardware Configuration)

Figure 26:
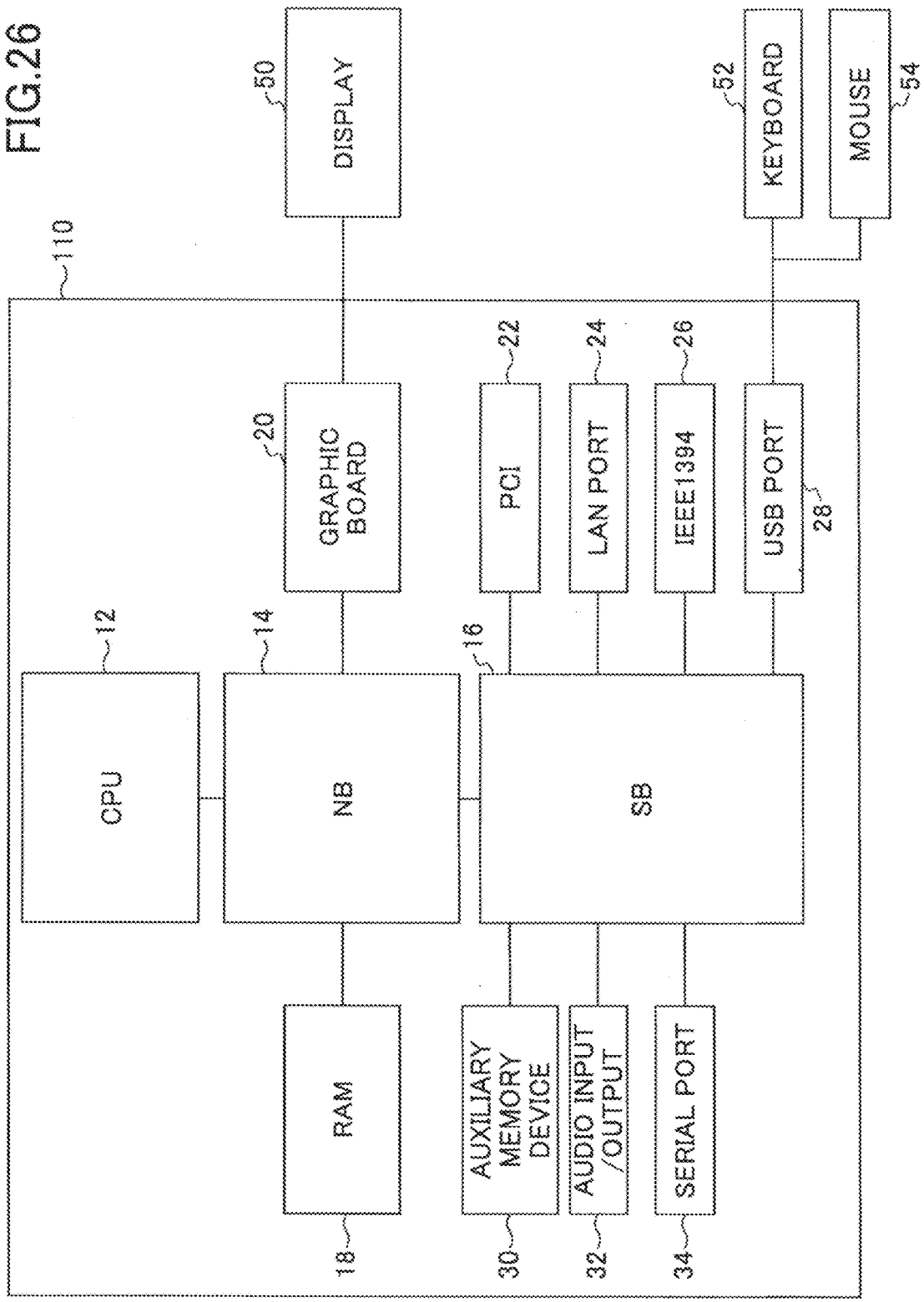
FIG. 26 is a diagram that illustrates a hardware configuration of a general-purpose computer device that constitutes an image processing device according to the present embodiment.

The hardware configuration of an image processing device 110 in the embodiments described above will be described below, with reference to FIG. 26. The image processing device 110 is typically configured as a general-purpose computer device. FIG. 26 is a diagram that illustrates a hardware configuration of a general-purpose computer device according to the present embodiment.

A general-purpose computer device 110 is configured as a desktop-type personal computer, a workstation, or the like. The general-purpose computer device 110 illustrated in FIG. 26 includes a Central Processing Unit (CPU) 12, a north bridge 14 that plays a role of connection between the CPU 12 and a memory, and a south bridge 16. The south bridge 16 is connected to the north bridge 14 through a dedicated bus or a PCI bus and plays a role of a connection to the PCI bus or an I/O such as a USB.

The north bridge 14 is connected to a Random Access Memory (RAM) 18 for providing a working area for the CPU 12, and a graphic board 20 for outputting a video signal. The graphic board 20 is connected to a display 50 or the projector 150 described above, through a video-image output interface such as an analog RGB, a High-Definition Multimedia Interface (HDMI) (registered or non-registered trademark), a Digital Visual Interface (DVI), or a Display-Port (registered trademark).

The south bridge 16 is connected to a Peripheral Component Interconnect (PCI) 22, a LAN port 24, an IEEE 1394 port 26, a Universal Serial Bus (USB) port 28, an auxiliary memory device 30, an audio input/output device 32, and a serial port 34. The auxiliary memory device 30 is a Hard Disk Drive (HDD), a Solid State Drive (SSD), or the like, and stores an OS for controlling a computer device, a program for realizing the functional parts described above, each kind of system information, and each kind of setting information. The LAN port 24 is an interface instrument for connecting the general-purpose computer device 110 to a network through a wire or wirelessly.

The USB port 28 is connected to an input device such as a keyboard 52 or a mouse 54, so that it is possible to provide a user interface for receiving an input of each kind of instruction from an operator. The general-purpose computer device 110 according to the present embodiment reads out a program from the auxiliary memory device 30 and executes development thereof in a working space provided by the RAM 18, so that each functional part and each process as described above are realized under control of the CPU 12. Here, although descriptions of the projector 150 and the camera 160 are not particularly provided, hardware such as a CPU or a RAM or hardware dependent on a particular application are included similarly.

SUMMARY

According to a configuration of the embodiment described above, it is possible to calculate a correction coefficient by using synthesis of sets of grid points for a subject projector that has projectors for divisional imaging in different imaging ranges at both ends in an array of a projection image, with a small shift from grid points for projectors for divisional imaging at both ends. Eventually, it is possible to preferably prevent a degradation of image quality that is caused by a lens distortion or a parallax in an overlap area of projection images from adjacent projectors in an obtained single image. Accordingly, an additional working load for correction of a lens distortion is reduced or a constraint on a usable camera is relaxed. Moreover, a constraint on a flatness of a screen is also relaxed. Hence, it is possible to obtain a correction condition for a plurality of projectors conveniently at a low cost under a relaxed condition.

Furthermore, for grid points that are included in a separate projection area between overlap areas for projectors at both ends of a subject projector, a value is used that is provided by blending grid points that correspond to a set used in both overlap areas. Accordingly, a rapid change in distortion is suppressed, and eventually, it is possible to obtain a single smooth image.

Furthermore, specifying a coordinate system for a projector memory (an output image) for both adjacent projectors and avoiding an overlap of grid patterns for detecting distortion of a projection image are facilitated. Eventually, it is possible to execute pattern extraction at better precision than a case where image processing for pattern separation is needed, and it is possible to execute a geometrical correction and a blending correction at high precision.

Furthermore, projecting a position adjustment pattern and a grid pattern not to overlap is facilitated by providing a marker for the position adjustment pattern outside of the grid pattern. Accordingly, it is possible to execute, at high precision, integration of coordinates of grid points for imaging images for calibration that are divisionally imaged more than once. Moreover, fixing a camera by a tripod during divisional imaging is not required or dedicated equipment for accurately controlling a position or direction of a camera is also not required, because it is possible to integrate imaging images for calibration that are divisionally imaged by using position adjustment patterns. Eventually, it is possible to obtain a correction condition for a plurality of projectors conveniently at a low cost under a more relaxed condition.

Furthermore, it is possible to execute divisional imaging of grid patterns for a plurality of projectors by controlling a configuration of a scene, so that it is possible to reduce a constraint on depth of imaging by a camera or the like even if the number of screens for multi-projection is increased.

As described above, according to an embodiment of the present invention, it is possible to provide a projection system, an image processing device, a projection method, and a program that are capable of obtaining, under a relaxed condition, a correction condition for images to be projected by a plurality of projection means, while a shift based on a lens distortion of an imaging means or a parallax is taken into consideration, in a case where calibration based on divisional imaging is executed in a projection system for projecting images onto a projection body by a plurality of projection means.

Here, it is possible to realize the functional parts described above by a computer-executable program described in a legacy programming language such as assembler, C, C++, C#, or Java (registered trademark) or an object-oriented programming language, and it is possible to store the program in a device-readable recording medium such as an ROM, an EEPROM, an EPROM, a flash memory, a flexible disk, a CD-ROM, a CD-RW, a DVD-ROM, a DVD-RAM, a DVD-RW, a Blu-ray disk, an SD card, or an MO or distribute the program through a telecommunication line. Furthermore, it is possible to install a part or all of the functional parts described above on, for example, a programmable device (PD) such as a field programmable gate array (FPGA) or it is possible for them to be installed as an application specific integrated circuit (ASIC), and it is possible to distribute circuit configuration data (bit stream data) to be downloaded onto a PD and data described in a Hardware Description Language (HDL), a Very High Speed Integrated Circuit (VHSIC) Hardware Description Language (VHDL), a Verilog-HDL, or the like, for producing the circuit configuration data, through a recording medium in order to realize the functional parts described above on the PD.

Although some embodiments of the present invention have been described above, an embodiment of the present invention is not limited to the embodiments described above and it is possible to apply a modification such as another embodiment, addition, modification, or deletion, within a scope that could be conceived of or attained by a person(s) skilled in the art, wherein any embodiment is included in the scope of the present invention as long as a function or effect of the present invention is provided.

APPENDIX

<An Illustrative Embodiment(s) of a Projection System, an Image Processing Device, a Projection Method, and a Program>

At least one illustrative embodiment of the present invention may relate to at least one of a projection system, an image processing device, a projection method, and a program. At least one illustrative embodiment of the present invention may relate to, more particularly, at least one of a projection system for projecting an image onto a projection body by a plurality of projection means, an image processing device that constitutes such a projection system, a projection method to be executed in such a projection system, and a program for realizing such an image processing device.

At least one illustrative embodiment of the present invention may be provided while an insufficient point(s) in the above-mentioned conventional technique(s) is/are taken into consideration, and at least one illustrative embodiment of the present invention may aim at providing a projection system, an image processing device, a projection method, and a program that are capable of obtaining, under a relaxed condition, a condition for correction of an image to be projected by a plurality of projection means that is considered by including a shift based on a lens distortion or a parallax of an imaging means in a case where a calibration is executed based on divisional imaging in a projection system for projecting an image onto a projection body by a plurality of projection means.

According to at least one illustrative embodiment of the present invention, there may be provided a projection system for projecting an image onto a projection body by a plurality of projection means, wherein the projection system has the under-mentioned feature(s) in order to solve a problem(s) as described above.

At least one illustrative embodiment of the present invention may be a projection system that includes an image preparation means for preparing a plurality of imaging images for calibration, a grid point extraction means for extracting a set of grid points that indicate a distortion of a projection image for at least one projection means from each of the plurality of imaging images for calibration, a grid point transformation means for executing a transformation between a plurality of images that are imaged in different imaging ranges on the plurality of imaging images for calibration in such a manner that each set of grid points that are commonly extracted for a subject projection means is provided in a common coordinate system, a grid point synthesis means for producing a set of grid points that are synthesized for a subject projection means based on a plurality of sets of grid points in a common coordinate system, and a correction coefficient calculation means for calculating a correction coefficient for a subject projection means based on a set of synthesized grid points.

Illustrative Embodiment (1) is a projection system for projecting an image onto a projection body by a plurality of projection means, wherein the projection system includes an image preparation means for preparing a plurality of imaging images for calibration, a grid point extraction means for extracting a set of grid points that indicate a distortion of a projection image for at least one projection means from each of the plurality of imaging images for calibration, a grid point transformation means for executing a transformation between a plurality of images that are imaged in different imaging ranges on the plurality of imaging images for calibration in such a manner that each set of grid points that are commonly extracted for a subject projection means is provided in a common coordinate system, a grid point synthesis means for producing a set of grid points that are synthesized for a subject projection means based on a plurality of sets of grid points in a common coordinate system, and a correction coefficient calculation means for calculating a correction coefficient for a subject projection means based on a set of synthesized grid points.

Illustrative Embodiment (2) is the projection system as described in Illustrative Embodiment (1), wherein the grid point synthesis means includes means for discriminating, among grid points for the subject projection means, a grid point that overlaps with a projection range of one of adjacent projection means in an array of projection images and a grid point that overlaps with a projection range for the other of the adjacent projection means, and means for calculating coordinate values of grid points that overlap with the one of projection ranges and grid points that overlap with the other of projection range, respectively, by using coordinate values of grid points in a set based on an imaging image for calibration that is imaged in an imaging range that is generally identical to an imaging image for calibration that includes a grid pattern for an overlapping projection means.

Illustrative Embodiment (3) is the projection system as described in Illustrative Embodiments (2), wherein the grid point synthesis means further includes means for discriminating, among grid points for the subject projection means, a grid point that does not overlap any of projection ranges for the one of projection means and the other of projection means, and means for blending coordinate values of corresponding grid points in a plurality of sets based on a plurality of imaging images for calibration that include each of both projection ranges, with grid points that do not overlap any of projection ranges and calculating coordinate values.

Illustrative Embodiment (4) is the projection system as described in any one of Illustrative Embodiments (1) to (3), further including an image output means for outputting, to a projection means, an image for calibration that includes one or both of a grid pattern for specifying grid points on a projection image and a position adjustment pattern for specifying a position adjustment point on an imaging image for calibration.

Illustrative Embodiment (5) is the projection system as described in Illustrative Embodiment (4), further including a scene preparation means for preparing a plurality of projection scenes for calibration that each include images for calibration to be output to at least one projection means, wherein the plurality of projection scenes for calibration are configured in such a manner that both adjacent projection means in an array of projection images do not project a grid pattern for an identical scene, configured in such a manner that each of the plurality of projection means projects a grid pattern at least once as a whole, configured in such a manner that a tree structure is formed through a connection based on a position adjustment pattern that is commonly projected by at least one projection means among scenes, and includes a plurality of scenes that correspond to imaging more than once in the different imaging ranges that commonly include a projection range for the subject projection means, on each of which the subject projection means projects a grid pattern.

Illustrative Embodiment (6) is the projection system as described in Illustrative Embodiment (5), wherein the plurality of projection scenes for calibration are further configured in such a manner that, in a plurality of scenes that correspond to imaging more than once in a generally identical imaging range, each of a plurality of projection means with projection ranges included in the generally identical imaging range projects a grid pattern for all of the plurality of scenes, and the plurality of scenes compose an at least partial tree structure through a connection based on a position adjustment pattern that is commonly projected by at least one projection means among the scenes.

Illustrative Embodiment (7) is the projection system as described in Illustrative Embodiment (4), further including a scene preparation means for preparing a plurality of projection scenes for calibration that each include images for calibration to be output to at least one projection means, wherein the plurality of projection scenes for calibration include a set of scenes configured in such a manner that one of two adjacent projection means projects a position adjustment pattern and a grid pattern in an array of projection images and the other projects a position adjustment pattern and a scene configured in such a manner that at least the other projects a position adjustment pattern and a grid pattern.

Illustrative Embodiment (8) is the projection system as described in any one of Illustrative Embodiments (4)-(7), further including a position adjustment point extraction means for extracting a position adjustment point for a projection image for a projection means from each of the plurality of imaging images for calibration, and a means for obtaining a projective transformation for executing a transformation between a coordinate system for each of a plurality of images that are imaged in the different imaging ranges and the common coordinate system based on a position adjustment point that is common among imaging images for calibration that are extracted by the position adjustment point extraction means.

Illustrative Embodiment (9) is the projection system as described in Illustrative Embodiment (8), further including an integration means for integrating sets of grid points for respective projection images for the plurality of projection means in a single coordinate system based on a position adjustment point that is common among imaging images for calibration that are extracted by the position adjustment point extraction means.

Illustrative Embodiment (10) is the projection system as described in Illustrative Embodiment (9), wherein the correction coefficient calculation means further includes a geometrical correction coefficient calculation means for calculating a geometrical correction coefficient that provides a projection image to be projected by each of the plurality of projection means, based on a grid point in the integrated single coordinate system, and a blending coefficient calculation means for detecting an overlap area between a projection image for a subject projection means and a projection image for each of projection means adjacent to the subject projection means, for each of the plurality of projection means, and calculating a blending coefficient that adjusts an overlap of images for the subject projection means and each of the adjacent projection means.

Illustrative Embodiment (11) is the projection system as described in Illustrative Embodiment (10), further including a correction processing means for each projection means for producing an intermediate image for each projection means from an image that is an object to be projected, based on a geometrical correction coefficient calculated by the geometrical correction coefficient calculation means and calculating a projection image for each projection means from the intermediate image, based on a blending coefficient calculated by the blending coefficient calculation means.

Illustrative Embodiment (12) is the projection system as described in any one of Illustrative Embodiments (1)-(11), wherein both or one of a projection device that is each projection means and an imaging device for imaging an imaging image for calibration are/is included.

Illustrative Embodiment (13) is an image processing device for executing projection by using a plurality of projection means, wherein the image processing device includes an image preparation means for preparing a plurality of imaging images for calibration, a grid point extraction means for extracting a set of grid points that indicate a distortion of a projection image for at least one projection means from each of the plurality of imaging images for calibration, a grid point transformation means for executing a transformation between a plurality of images that are imaged in different imaging ranges on the plurality of imaging images for calibration in such a manner that each set of grid points that are commonly extracted for a subject projection means is provided in a common coordinate system, a grid point synthesis means for producing a set of grid points that are synthesized for a subject projection means based on a plurality of sets of grid points in a common coordinate system, and a correction coefficient calculation means for calculating a correction coefficient for a subject projection means based on a set of synthesized grid points.

Illustrative Embodiment (14) is a projection method for projecting an image onto a projection body by a plurality of projection means, wherein the projection method includes a step of causing a computer to prepare a plurality of imaging images for calibration, a step of causing a computer to extract a set of grid points that indicate a distortion of a projection image for at least one projection means from each of the plurality of imaging images for calibration, a step of causing a computer to execute a transformation between a plurality of images that are imaged in different imaging ranges on the plurality of imaging images for calibration in such a manner that each set of grid points that are commonly extracted for a subject projection means is provided in a common coordinate system, a step of causing a computer to produce a set of grid points that are synthesized for a subject projection means based on a plurality of sets of grid points in the common coordinate system, and a step of causing a computer to calculate a correction coefficient for a subject projection means based on a set of synthesized grid points.

Illustrative Embodiment (15) is the projection method as described in Illustrative Embodiment (14), wherein the step of producing a set of the synthesized grid points includes a step of discriminating, among grid points for the subject projection means, a grid point that overlaps with a projection range for one of adjacent projection means in an array of projection images and a grid point that overlaps with a projection range for the other of the adjacent projection means, and a step of calculating coordinate values of grid points that overlap with the one of projection ranges and grid points that overlap with the other of projection ranges, respectively, by using coordinate values of grid points in a set based on an imaging image for calibration that is imaged in an imaging range that is a generally identical to an imaging image for calibration that includes a grid pattern for an overlapping projection means.

Illustrative Embodiment (16) is the projection method as described in Illustrative Embodiment (15), wherein the step of producing a set of the synthesized grid points further includes a step of discriminating, among grid points for the subject projection means, a grid point that does not overlap with any of both projection ranges for the one of projection means and the other of projection means, and a step of blending coordinate values of corresponding grid points in a plurality of sets based on a plurality of imaging images for calibration that include each of both projection ranges, with grid points that do not overlap with any of both the projection ranges and calculate coordinate values.

Illustrative Embodiment (17) is a program for realizing an image processing device for executing projection by using a plurality of projection means, wherein the program causes a computer to function as an image preparation means for preparing a plurality of imaging images for calibration, a grid point extraction means for extracting a set of grid points that indicate a distortion of a projection image for at least one projection means from each of the plurality of imaging images for calibration, a grid point transformation means for executing a transformation between a plurality of images that are imaged in different imaging ranges on the plurality of imaging images for calibration in such a manner that each set of grid points that are commonly extracted for a subject projection means is provided in a common coordinate system, a grid point synthesis means for producing a set of grid points that are synthesized for a subject projection means based on a plurality of sets of grid points in the common coordinate system, and a correction coefficient calculation means for calculating a correction coefficient for a subject projection means based on a set of synthesized grid points.

According to the above-mentioned configuration of at least one illustrative embodiment of the present invention, it may be possible to obtain, under a relaxed condition, a condition for correction of an image to be projected by a plurality of projection means that is considered by including a shift based on a lens distortion or a parallax of an imaging means in a case where a calibration is executed based on divisional imaging in a projection system for projecting an image onto a projection body by a plurality of projection means.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application is based on and claims the benefit of priority to Japanese Patent Application No. 2013-190304 filed on Sep. 13, 2013, the entire content(s) of which is/are herein incorporated by reference.

What is claimed is:

1. A projection system for projecting an image onto a projection body by a plurality of projection devices, the projection system comprising:
    an image preparation unit configured to prepare a plurality of capturing images for calibration;
    a grid point extraction unit configured to extract a set of grid points that indicates a distortion of a projection image for at least one projection device from each of the plurality of capturing images for calibration;
    a grid point transformation unit configured to execute a transformation in such a manner that each set of the grid points, for a subject projection device that are commonly extracted between a plurality of images that are imaged in different imaging ranges on the plurality of captured images for calibration, is provided in a common coordinate system;
    a grid point synthesis unit configured to produce a set of the grid points that are synthesized for a subject projection device based on a plurality of sets of the grid points in the common coordinate system; and
    a correction coefficient calculation unit configured to calculate a correction coefficient for a subject projection device based on a set of the synthesized grid points.

2. The projection system as claimed in claim 1, wherein the plurality of projection devices are arranged side by side, and
    the grid point synthesis unit is further configured to
        determine, among grid points for the subject projection device, whether a grid point that overlaps a projection range of one of adjacent projection devices in an array of projection images and a grid point that overlaps a projection range for the other of the adjacent projection devices, and
        calculate coordinate values of grid points that overlap the one of projection ranges and grid points that overlap the other of projection ranges, respectively, by using coordinate values of grid points in a set based on a capturing image for calibration that is imaged in an imaging range that is generally identical to a capturing image for calibration that includes a grid pattern for an overlapping projection device.

3. The projection system as claimed in claim 2, wherein the grid point synthesis unit is further configured to
    determine, among grid points for the subject projection device, whether a grid point that does not overlap any of projection ranges for the one of projection devices and the other of projection devices, and blend coordinate values of corresponding grid points in a plurality of sets based on a plurality of capturing images for calibration that include both projection ranges, with grid points that do not overlap any of the projection ranges and to calculate the coordinate values.

4. The projection system as claimed in claim 1, further comprising:
an image output unit configured to output, to a projection device, an image for calibration that includes one or both of a grid pattern for specifying grid points on a projection image and a position adjustment pattern for specifying a position adjustment point on an capturing image for calibration.

5. The projection system as claimed in claim 4, further comprising:
a scene preparation unit configured to prepare a plurality of projection scenes for calibration that each include images for calibration to be output to at least one projection device, wherein
the plurality of projection scenes for calibration are configured in such a manner that
both adjacent projection devices in an array of projection images do not project a grid pattern for an identical scene,
each of the plurality of projection devices projects a grid pattern at least once as a whole,
a tree structure is formed through a connection based on a position adjustment pattern that is commonly projected by at least one projection device among scenes, and
includes a plurality of scenes that correspond to imaging more than once in different imaging ranges that commonly include a projection range for the subject projection device, on each of which the subject projection device projects a grid pattern.

6. The projection system as claimed in claim 5, wherein the plurality of projection scenes for calibration are further configured in such a manner that, in a plurality of scenes that correspond to imaging more than once in a generally identical imaging range,
each of a plurality of projection devices with projection ranges included in the generally identical imaging range projects a grid pattern for all of the plurality of scenes, and
the plurality of projection scenes compose an at least partial tree structure through a connection based on a position adjustment pattern that is commonly projected by at least one projection device among the scenes.

7. The projection system as claimed in claim 4, further comprising:
a scene preparation unit configured to prepare a plurality of projection scenes for calibration that each include images for calibration to be output to at least one projection device, wherein
the plurality of projection scenes for calibration include a set of scenes configured in such a manner that one of two adjacent projection devices projects a position adjustment pattern and a grid pattern in an array of projection images and the other projects a position adjustment pattern and a scene configured in such a manner that at least the other projects a position adjustment pattern and a grid pattern.

8. The projection system as claimed in claim 1, further comprising:

a position adjustment point extraction unit configured to extract a position adjustment point for the projection image for the projection device from each of the plurality of capturing images for calibration; and
a unit configured to obtain a projective transformation for executing a transformation between a coordinate system for each of the plurality of images that are imaged in different imaging ranges and the common coordinate system based on a position adjustment point that is common among the capturing images for calibration that are extracted by the position adjustment point extraction unit.

9. The projection system as claimed in claim 8, further comprising:
an integration unit configured to integrate sets of the grid points for respective projection images for the plurality of projection devices in a single coordinate system based on a position adjustment point that is common among capturing images for calibration that are extracted by the position adjustment point extraction unit.

10. The projection system as claimed in claim 9, wherein the correction coefficient calculation unit further includes:
a geometrical correction coefficient calculation device configured to calculate a geometrical correction coefficient that provides a projection image to be projected by each of the plurality of projection devices, based on a grid point in the integrated single coordinate system, and
a blending coefficient calculation device configured to
detect an overlap area between a projection image for a subject projection device and a projection image for each of projection devices adjacent to the subject projection device, for each of the plurality of projection devices, and
calculate a blending coefficient that adjusts an overlap of images for the subject projection device and each of the adjacent projection devices.

11. The projection system as claimed in claim 10, further comprising:
a correction processing unit for each projection device being configured to
produce an intermediate image for each projection device from an image that is an object to be projected, based on a geometrical correction coefficient calculated by the geometrical correction coefficient calculation unit, and
calculate a projection image for each projection device from the intermediate image, based on a blending coefficient calculated by the blending coefficient calculation device.

12. An image processing device for executing projection by using a plurality of projection devices, the image processing device comprising:
an image preparation unit configured to prepare a plurality of capturing images for calibration;
a grid point extraction unit configured to extract a set of grid points that indicates a distortion of a projection image for at least one projection device from each of the plurality of capturing images for calibration;
a grid point transformation unit configured to execute a transformation in such a manner that each set of the grid points, for a subject projection device that are commonly extracted between a plurality of images that are imaged in different imaging ranges on the plurality of captured images for calibration, is provided in a common coordinate system;

a grid point synthesis unit configured to produce a set of the grid points that are synthesized for a subject projection device based on a plurality of sets of the grid points in the common coordinate system; and a correction coefficient calculation unit configured to calculate a correction coefficient for a subject projection device based on a set of the synthesized grid points.

13. A projection method for projecting an image onto a projection body by a plurality of projection devices, the method comprising:

preparing a plurality of capturing images for calibration;

extracting a set of grid points that indicates a distortion of a projection image for at least one projection device from each of the plurality of capturing images for calibration;

executing a transformation in such a manner that each set of the grid points, for a subject projection device that are commonly extracted between a plurality of images that are imaged in different imaging ranges on the plurality of captured images for calibration, is provided in a common coordinate system;

producing a set of the grid points that are synthesized for a subject projection device based on a plurality of sets of the grid points in the common coordinate system; and calculating a correction coefficient for a subject projection device based on a set of the synthesized grid points.

14. The projection method as claimed in claim 13, wherein the producing the set of the synthesized grid points includes:

determining, among grid points for the subject projection device, whether a grid point that overlaps with a projection range for one of adjacent projection devices in an array of projection images and a grid point that overlaps a projection range for the other of the adjacent projection devices, and calculating coordinate values of grid points that overlap the one of projection ranges and grid points that overlap the other of projection ranges, respectively, by using coordinate values of grid points in a set based on an capturing image for calibration that is imaged in an imaging range that is a generally identical to an capturing image for calibration that includes a grid pattern for an overlapping projection device.

15. The projection method as claimed in claim 14, wherein the producing the set of the synthesized grid points further includes:

determining, among grid points for the subject projection device, whether a grid point that does not overlap any of projection ranges for the one of projection devices and the other of projection devices, and blending coordinate values of corresponding grid points in a plurality of sets based on a plurality of capturing images for calibration that include both projection ranges, with grid points that do not overlap any of the projection ranges and calculating the coordinate values.

* * * * *